United States Patent
Chen et al.

(10) Patent No.: US 11,968,552 B2
(45) Date of Patent: *Apr. 23, 2024

(54) RADIO LINK MONITORING METHOD AND USER EQUIPMENT

(71) Applicant: VIVO MOBILE COMMUNICATION CO., LTD., Guangdong (CN)

(72) Inventors: Li Chen, Chang'an Dongguan (CN); Yumin Wu, Chang'an Dongguan (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 77 days.

This patent is subject to a terminal disclaimer.

(21) Appl. No.: 17/717,028

(22) Filed: Apr. 8, 2022

(65) Prior Publication Data

US 2022/0240117 A1 Jul. 28, 2022

Related U.S. Application Data

(63) Continuation of application No. 16/637,242, filed as application No. PCT/CN2018/097030 on Jul. 25, 2018, now Pat. No. 11,330,454.

(30) Foreign Application Priority Data

Aug. 7, 2017 (CN) .......................... 201710668188.0

(51) Int. Cl.
*H04W 24/08* (2009.01)
*H04L 5/00* (2006.01)
(Continued)

(52) U.S. Cl.
CPC ............. *H04W 24/08* (2013.01); *H04L 5/001* (2013.01); *H04L 5/0091* (2013.01);
(Continued)

(58) Field of Classification Search
None
See application file for complete search history.

(56) References Cited

U.S. PATENT DOCUMENTS

| | | |
|---|---|---|
| 2012/0020230 A1 | 1/2012 | Chen et al. |
| 2014/0043988 A1 | 2/2014 | Chen et al. |
| | (Continued) | |

FOREIGN PATENT DOCUMENTS

| | | |
|---|---|---|
| CN | 1992966 A | 7/2007 |
| CN | 102291731 A | 12/2011 |
| | (Continued) | |

OTHER PUBLICATIONS

European Search Report in Application No. 18843621.6 dated Apr. 28, 2020.

(Continued)

*Primary Examiner* — Faruk Hamza
*Assistant Examiner* — Cassandra L Decker
(74) *Attorney, Agent, or Firm* — Price Heneveld LLP

(57) ABSTRACT

A radio link monitoring method performed by user equipment, includes: determining configuration information for performing a radio link monitoring operation on a plurality of Bandwidth Parts of a system bandwidth; and performing the radio link monitoring operation on a plurality of target BWPs among the plurality of BWPs of the system bandwidth in accordance with the configuration information. Specifically, the preforming the radio link monitoring operation on the plurality of target BWPs comprises: performing the radio link monitoring operation on the plurality of target BWPs through one counting unit for the radio link monitoring operation.

18 Claims, 2 Drawing Sheets

(51) Int. Cl.
  H04L 27/00    (2006.01)
  H04W 24/02    (2009.01)
  H04W 28/20    (2009.01)
  H04W 52/02    (2009.01)
  H04W 76/18    (2018.01)

(52) U.S. Cl.
  CPC ......... *H04L 27/0006* (2013.01); *H04W 24/02* (2013.01); *H04W 28/20* (2013.01); *H04W 52/0212* (2013.01); *H04W 76/18* (2018.02); *Y02D 30/70* (2020.08)

(56) References Cited

U.S. PATENT DOCUMENTS

| | | |
|---|---|---|
| 2014/0247800 A1 | 9/2014 | Ro et al. |
| 2015/0009924 A1 | 1/2015 | Takano |
| 2016/0135176 A1 | 5/2016 | Wong et al. |
| 2017/0041112 A1 | 2/2017 | Kim et al. |
| 2017/0126439 A1 | 5/2017 | Yoshimoto et al. |
| 2018/0338253 A1 | 11/2018 | Nagaraja et al. |
| 2019/0021045 A1* | 1/2019 | Kim .................. H04W 48/12 |
| 2019/0089579 A1 | 3/2019 | Sang et al. |
| 2020/0037332 A1* | 1/2020 | da Silva ............ H04W 72/542 |
| 2020/0059345 A1 | 2/2020 | Pelletier et al. |
| 2020/0228282 A1 | 7/2020 | Kwak et al. |

FOREIGN PATENT DOCUMENTS

| | | |
|---|---|---|
| CN | 102883341 A | 1/2013 |
| CN | 103096479 A | 5/2013 |
| CN | 104081809 A | 10/2014 |
| CN | 104509018 A | 4/2015 |
| CN | 106233773 A | 12/2016 |
| WO | 2017026755 A1 | 2/2017 |

OTHER PUBLICATIONS

CN Office Action in Application No. 201710668188.0 dated Mar. 16, 2020.
CN Search Report in Application No. 201710668188.0 dated Apr. 24, 2019.
"HARQ for UL LAA" 3GPP TSG RAN WG1 Meeting #85, ZTE, R1-164572, May 23, 2016.
"Discussion on Radio Link Monitoring in NR" 3GPP TSG RAN WG1 Meeting NR#2, LG Electronics, R1-1710274, Jun. 27, 2017.
"Open issues for wider badnwidth operations" 3GPP TAG RAN WG1 NR Ad-Hoc#2, Intel Corporation, R1-1710583, Jun. 27, 2017.
"NR Radio Link Monitoring" 3GPP TSG RAN WG1 NR Ad-Hoc#2, Nokia, Alcatel-Lucent Shanghai Bell, R1-1711269, Jun. 27, 2017.
Written Opinion and International Search Report in Application No. PCT/CN2018/097030 dated Oct. 29, 2018.
U.S. Office Action in U.S. Appl. No. 16/637,242 dated Jul. 1, 2021.
U.S. Office Action in U.S. Appl. No. 16/637,242 dated Oct. 21, 2021.

* cited by examiner

RADIO LINK MONITORING METHOD AND USER EQUIPMENT

CROSS-REFERENCE TO RELATED APPLICATION

The present application claims the benefit of and is a continuation application of U.S. patent application Ser. No. 16/637,242, which is the U.S. national phase of PCT Application PCT/CN2018/097030 filed on Jul. 25, 2018, which claims a priority of Chinese patent application No. 201710668188.0 filed on Aug. 7, 2017, which are incorporated herein by reference in their entirety.

TECHNICAL FIELD

The present disclosure relates to the field of communication technology, in particular to a radio link monitoring method and a User Equipment (UE).

BACKGROUND

In a conventional $4^{th}$-Generation (4G) communication system, an RLM mechanism is used to detect quality of a Physical Downlink Control Channel (PDCCH). During a radio link monitoring procedure, a radio link is monitored by a UE through measuring Signal to Interference plus Noise Ratios (SINRs) of parts of Cell-specific Reference Signals (CRSs) for the PDCCH.

When the measured SINRs of parts of the CRSs for the PDCCH are each smaller than a predetermined threshold, it means that the radio link is in an out-of-sync state, and at this time a physical layer may transmit an out-of-sync indications to a high layer (a Radio Resource Control (RRC) layer). When N consecutive out-of-sync indications have been received by the RRC layer, the UE may start a radio link failure timer (T1).

When the measured SINRs of parts of the CRSs for the PDCCH are each greater than another threshold, it means that the radio link is in an in-sync state, and at this time the physical layer may transmit an in-sync indication to the high layer (the RRC layer). When M consecutive in-sync indications have been received by the RRC layer, the UE may stop the timer T1.

When the timer T1 has timed out, the UE may determine that there is a radio link failure. At this time, a radio link failure event may be triggered, and the UE may re-initiate the establishment of the radio link.

The quantities of the out-of-sync indications and in-sync indications, i.e., N and M, are configured by a network device, and a timeout length of the timer T1 is also configured by the network device.

In the 4G communication system, the RLM mechanism needs to monitor the reference signal at a full frequency band. Due to an indefinite monitoring purpose, a significant waste of radio resources may occur.

In a $5^{th}$-Generation (5G) communication system, the RLM mechanism is also used to detect the quality of the PDCCH. Different from the 4G communication system, in the 5G communication system, a bandwidth is further divided into a plurality of Bandwidth Parts (BWPs), so as to provide more granular narrow-band services.

With respect to bandwidth features of the 5G communication system, it is able for the BWP-based RLM to provide a finer level of monitoring granularity as compared with the RLM at the full frequency band, thereby to prevent the occurrence of the waste of the radio resources. In addition, it is also able to reduce the power consumption for the UE during the RLM.

SUMMARY

In one aspect, the present disclosure provides in some embodiments a radio link monitoring method performed by a UE, including: determining configuration information for performing a radio link monitoring operation on a plurality of Bandwidth Parts (BWPs) of a system bandwidth; and performing the radio link monitoring operation on a plurality of target BWPs among the plurality of BWPs of the system bandwidth in accordance with the configuration information. Specifically, the preforming the radio link monitoring operation on the plurality of target BWPs comprises: performing the radio link monitoring operation on the plurality of target BWPs through one counting unit for the radio link monitoring operation, wherein the one counting unit comprises a radio link in-sync counter, a radio link out-of-sync counter, and a radio link failure timer. And the performing the radio link monitoring operation on the plurality of BWPs through the one counting unit for the radio link monitoring operation comprises: performing, through the one counting unit, the radio link monitoring operation on all target BWPs of the plurality of target BWPs. And the performing, through the one counting unit, the radio link monitoring operation on all target BWPs of the plurality of target BWPs comprises: during the radio link monitoring operation, when a radio link corresponding to any one target BWP of the plurality of target BWPs monitored by the one counting unit is in the out-of-sync state, causing the radio link out-of-sync counter of the one counting unit to count in a cumulative manner; and/or when a radio link corresponding to any one target BWP of the plurality of target BWPs monitored by the one counting unit is in the in-sync state, causing the radio link in-sync counter of the one counting unit to count in a cumulative manner.

In another aspect, the present disclosure provides in some embodiments a radio link monitoring method performed by a UE, including: determining configuration information for performing a radio link monitoring operation on a plurality of Bandwidth Parts (BWPs) of a system bandwidth; and performing the radio link monitoring operation on a plurality of target BWPs among the plurality of BWPs of the system bandwidth in accordance with the configuration information. Specifically, the preforming the radio link monitoring operation on the plurality of target BWPs comprises: performing the radio link monitoring operation on the plurality of target BWPs through at least two counting units for the radio link monitoring operation, wherein each of the at least two counting units comprises a radio link in-sync counter, a radio link out-of-sync counter, and a radio link failure timer. And there exist at least three target BWPs which are divided into one first portion and one second portion, the one first portion comprises at least one target BWP and the at least one target BWP corresponds to a first counting unit of the two counting unit, and the second portion comprises at least two target BWPs and the at least two target BWPs correspond to a second counting unit of the two counting unit. And the performing the radio link monitoring operation on the plurality of target BWPs through the at least two counting units for the radio link monitoring operation includes: performing, through each counting unit of the at least two counting units, the radio link monitoring operation on the at least one target BWPs of the first portion and the at least two target BWPs of the second portion respectively.

In yet another aspect, the present disclosure provides in some embodiments a UE, including a memory, a processor, and a computer program stored in the memory and executed by the processor. The processor is configured to execute the program so as to implement any one of the above-mentioned radio link monitoring methods.

DETAILED DESCRIPTION

Figure 1:
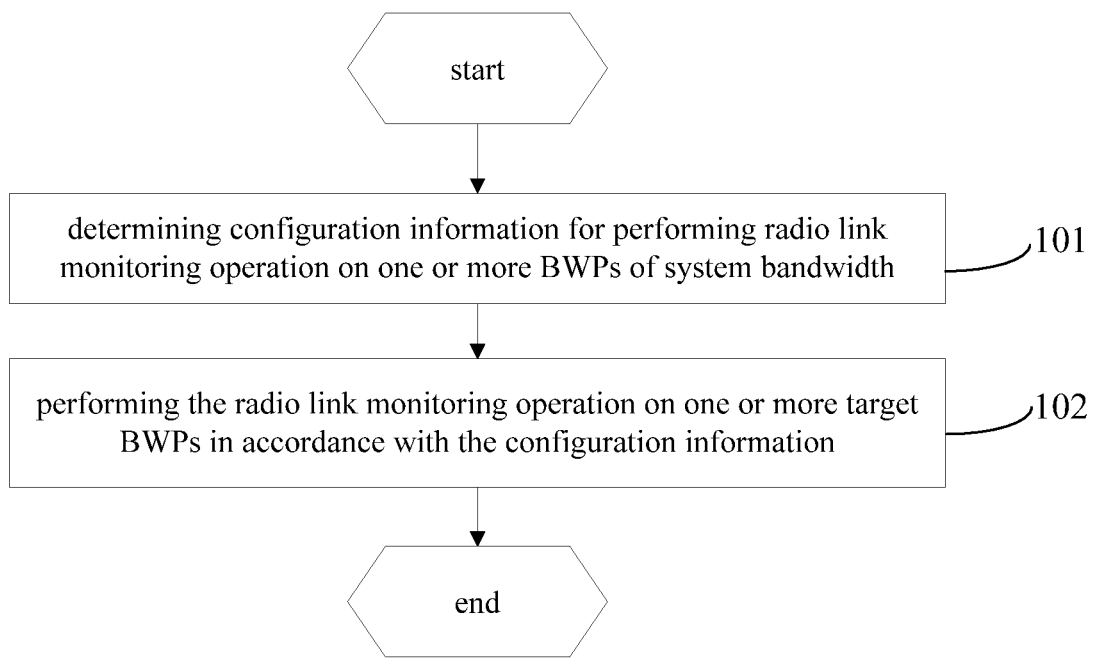
FIG. 1 is a flow chart of a radio link monitoring method according to some embodiments of the present disclosure.

In order to make the objects, the technical solutions and the advantages of the present disclosure more apparent, the present disclosure will be described hereinafter in a clear and complete manner in conjunction with the drawings and embodiments. In the following description, specific details of configurations and assemblies are merely provided to facilitate the understanding of the present disclosure. It should be appreciated that, a person skilled in the art may make further modifications and alternations without departing from the spirit of the present disclosure. In addition, for clarification, any known function and structure will not be described hereinafter.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be appreciated that, the following serial numbers do not refer to the order of the steps. Actually, the order shall be determined in accordance with functions and internal logic of the steps, but shall not be construed as limiting the implementation in any form.

Different from a 4G communication system, in a 5G communication system, a bandwidth is divided into several BWPs, and each BWP corresponds to one bandwidth segment. With respect to this scenario, the present disclosure has first proposed a BWP-based radio link monitoring scheme, so as to provide a more definite monitoring purpose as compared with a radio link monitoring scheme at a full frequency band in the related art. An object of the present disclosure is to provide a BWP-based radio link monitoring method and a UE, so as to prevent the occurrence of radio resource waste during the radio link monitoring.

The present disclosure provides in some embodiments a radio link monitoring method for a UE, which includes Steps 101 and 102.

Step 101: determining configuration information for performing a radio link monitoring operation on one or more BWPs of a system bandwidth.

Illustratively, in Step 101, the configuration information for performing the radio link monitoring operation on the one or more BWPs may be determined by the UE in accordance with a predefined protocol, and/or acquired by the UE from a network device.

When the configuration information is acquired by the UE from the network device, the network device for transmitting the configuration information may be a base station, e.g., a gNB in an NR system or an eNB in an LTE system. In a possible embodiment of the present disclosure, the configuration information may be carried in an existing signal and notified by the network device to the UE. The existing signal may include, but not limited to, an RRC message.

Step 102: performing the radio link monitoring operation on one or more target BWPs in accordance with the configuration information, the one or more target BWPs belonging to the one or more BWPs.

Obviously, through the above steps of the radio link monitoring method, the radio link monitoring operation may be performed with the BWP as granularity. As compared with the conventional radio link monitoring method for the 4G communication system at a full frequency band, it is able to perform the radio link monitoring operation in a more accurate manner, thereby to prevent the waste of radio resources and reduce the power consumption for the UE during the radio link monitoring operation. Hence, the radio link monitoring method in the embodiments of the present disclosure has a very high practical value.

Obviously, the radio link monitoring method may be applied to all UEs, and for a wireless network, it is able to effectively prevent the waste of the radio resources. Hence, the radio link monitoring method in the embodiments of the present disclosure has a very high application value.

The radio link monitoring method will be described hereinafter in more details.

To be specific, in Step 102, counting units may be configured to perform the radio link monitoring operation on the one or more target BWPs. Each counting unit may include a radio link in-sync counter, a radio link out-of-sync counter, and a radio link failure timer.

The radio link in-sync counter, the radio link out-of-sync counter and the radio link failure timer may have same functions as those applied to the 4G communication system as mentioned hereinabove. It should be appreciated that, although with the same functions, operating modes for achieving these functions may not be necessarily the same. Some feasible operating modes will be described hereinafter.

Operating Mode #1

For example, there is at least one target BWP, and the counting units may correspond to the target BWPs respectively. The performing, by the UE using the counting units, the radio link monitoring operation on the target BWPs corresponding to the counting units may include: during the radio link monitoring operation, when a radio link corresponding to a predetermined target BWP is in an out-of-sync state, causing the radio link out-of-sync counter of the counting unit corresponding to the predetermined target BWP to count in a cumulative manner; and/or when the radio link corresponding to the predetermined target BWP is in an in-sync state, causing the radio link in-sync counter of the counting unit corresponding to the predetermined target BWP to count in a cumulative manner.

The radio link out-of-sync counter of the counting unit corresponding to the predetermined target BWP is merely configured to count the quantity of out-of-sync times when the radio link corresponding to the predetermined target BWP is continuously in the out-of-sync state, and the radio link in-sync counter of the counting unit corresponding to the predetermined target BWP is merely configured to count the quantity of in-sync times when the radio link corresponding to the predetermined target BWP is continuously in the in-sync state.

When the radio link is continuously in the out-of-sync state, it means that there is no in-sync state between two out-of-sync states. When the radio link is in the in-sync state after being in the out-of-sync state, the radio link out-of-sync counter for counting the quantity of the out-of-sync times of the radio link needs to be restarted.

When the radio link is continuously in the in-sync state, it means that there is no out-of-sync state between two in-sync states. When the radio link is in the out-of-sync state after being in the in-sync state, the radio link in-sync counter for counting the quantity of the in-sync times of the radio link needs to be restarted.

Illustratively, the one or more target BWPs may include a BWP1 corresponding to a counting unit 1, a BWP2 corresponding to a counting unit 2, and a BWP3 corresponding to a counting unit 3.

When the UE has determined that the radio link corresponding to BWP1 is in the out-of-sync state, merely the radio link out-of-sync counter of the counting unit 1 may be caused to count in a cumulative manner. When the UE has determined that the radio link corresponding to BWP2 is in the out-of-sync state, merely the radio link out-of-sync counter of the counting unit 2 may be caused to count in a cumulative manner. When the UE has determined that the radio link corresponding to BWP3 is in the out-of-sync state, merely the radio link out-of-sync counter of the counting unit 3 may be caused to count in a cumulative manner.

This mode may also be applied to the radio link in-sync counter. In other words, when the UE has determined that the radio link corresponding to BWP1 is in the in-sync state, merely the radio link in-sync counter of the counting unit 1 may be caused to count in a cumulative manner. When the UE has determined that the radio link corresponding to BWP2 is in the in-sync state, merely the radio link in-sync counter of the counting unit 2 may be caused to count in a cumulative manner. When the UE has determined that the radio link corresponding to BWP3 is in the in-sync state, merely the radio link in-sync counter of the counting unit 3 may be caused to count in a cumulative manner.

The determining that the radio link corresponding to the target BWP is in the out-of-sync state may include, when received quality of a reference signal for the target BWP does not meet a predetermined condition and/or when an indication indicating that the target BWP or the current UE is in the out-of-sync state has been received from a low layer, determining that the radio link corresponding to the target BWP is in the out-of-sync state. The determining that the radio link corresponding to the target BWP is in the in-sync state may include, when the received quality of the reference signal for the target BWP meets the predetermined condition and/or when an indication indicating that the target BWP or the current UE is in the in-sync state has been received from the low layer, determining that the radio link corresponding to the target BWP is in the in-sync state.

Here, whether the received quality of the reference signal meets the predetermined condition may be determined in accordance with at least one of an SINR, RSRP, RSRQ and RSSI. For example, when the SINR of the reference signal does not reach a predetermined standard, the received quality may be determined as not meeting the predetermined condition.

The indication indicating that the target BWP or the current UE is in the in-sync state from the low layer may be an in-sync indication, or any other indication capable of implicitly indicating the in-sync state.

It should be appreciated that, the UE may determine that the radio link corresponding to the BWP is in the in-sync or out-of-sync state in various modes. Hence, the above method shall not be construed as limiting the scope of the present disclosure, and different determination modes may be used in combination.

Further, when a value of the radio link out-of-sync counter reaches a first predetermined threshold, the radio link failure timer which belongs to the same counting unit as the radio link out-of-sync counter may be caused; and/or during the operation of the radio link failure timer, when a value of the radio link in-sync counter which belongs to the same counting unit as the radio link failure timer reaches a second predetermined threshold, the radio link failure timer may be stopped or reset.

When a value of the radio link failure timer of any counting unit reaches a predetermined threshold, a radio link processing procedure may be performed. The radio link processing procedure may include at least one of: triggering a radio link failure operation; performing a deactivation procedure, a replacement procedure or a reconfiguration procedure on the BWP for the radio link monitoring operation; triggering a failure event for the BWP for the radio link monitoring operation; performing the deactivation procedure, the replacement procedure or the reconfiguration procedure on the BWP corresponding to the counting unit including the radio link failure timer whose value reaches the predetermined threshold; and triggering the failure event for the BWP corresponding to the counting unit including the radio link failure timer whose value reaches the predetermined threshold.

The triggering of the failure event for the BWP is a known function. Based on this, when the failure event is triggered for the BWP, the deactivation procedure, the replacement procedure or the reconfiguration procedure may be performed on the BWP for which the failure event is triggered; or when the failure event is triggered for the BWP, the deactivation procedure, the replacement procedure or the reconfiguration procedure may be performed on the BWP for the radio link monitoring operation.

Further, when the value of each radio link failure timer corresponding to each counting unit reaches the predetermined threshold, a radio link processing procedure may be performed. The radio link processing procedure may include at least one of: triggering a radio link failure operation; performing a deactivation procedure, a replacement procedure or a reconfiguration procedure on the BWP for the radio link monitoring operation; and triggering a failure event for the BWP for the radio link monitoring operation.

The deactivation procedure may be used to stop the radio link monitoring operation on the corresponding BWP, the replacement procedure may be used to replace the BWP for the radio link monitoring operation is performed, and the reconfiguration procedure may be used to reconfigure a radio link monitoring parameter of the BWP or replace the BWP for the radio link monitoring operation.

Operating Mode #2

For example, there is at least two target BWPs corresponding to one counting unit. The performing, by the UE using the counting unit, the radio link monitoring operation on the target BWPs corresponding to the counting unit may include: during the radio link monitoring operation, when a radio link corresponding to any target BWP is in an out-of-sync state, causing the radio link out-of-sync counter of the counting unit to count in a cumulative manner; and/or when the radio link corresponding to any target BWP is in an in-sync state, causing the radio link in-sync counter of the counting unit to count in a cumulative manner.

The radio link out-of-sync counter of the counting unit corresponding to each target BWP is merely configured to count the quantity of out-of-sync times when the radio link corresponding to the target BWP itself is continuously in the out-of-sync state, and/or the radio link in-sync counter of the counting unit corresponding to each target BWP is merely configured to count the quantity of in-sync times when the radio link corresponding to the target BWP itself is continuously in the in-sync state.

When the radio link is continuously in the out-of-sync state, it means that there is no in-sync state between two out-of-sync states. When the radio link is in the in-sync state after being in the out-of-sync state, the radio link out-of-sync counter for counting the quantity of the out-of-sync times of the radio link needs to be restarted.

When the radio link is continuously in the in-sync state, it means that there is no out-of-sync state between two in-sync states. When the radio link is in the out-of-sync state after being in the in-sync state, the radio link in-sync counter for counting the quantity of the in-sync times of the radio link needs to be restarted.

Illustratively, the one or more target BWPs may include a BWP1 and a BWP2 both corresponding to a counting unit 1, and a BWP3 corresponding to a counting unit 2.

Here, the BWP1 and the BWP2 correspond to the same counting unit i1, so during the radio link monitoring on the BWP1 and the BWP2, a same radio link in-sync counter, a same radio link out-of-sync counter and a same radio link failure timer may be used. In other words, no matter whether a radio link corresponding to the BWP1 or a radio link corresponding to the BWP2 is in the out-of-sync state, the UE needs to control the radio link out-of-sync counter of the counting unit 1 to count in a cumulative manner. This counting mode may also be applied to the radio link in-sync counter of the counting unit 1.

The BWP3 corresponds to the counting unit 2, so when a radio link corresponding to the BWP3 is in the out-of-sync state, the UE may merely control the radio link out-of-sync counter of the counting unit 2 to count in a cumulative manner, while the radio link out-of-sync counter of the counting unit 1 may not be enabled.

The determining that the radio link corresponding to each target BWP is in the out-of-sync state may include, when received quality of a reference signal for the target BWP does not meet a predetermined condition and/or when an indication indicating that the target BWP or the current UE is in the out-of-sync state has been received from a low layer, determining that the radio link corresponding to the target BWP is in the out-of-sync state. The determining that the radio link corresponding to each target BWP is in the in-sync state may include, when the received quality of the reference signal for the target BWP meets the predetermined condition and/or when an indication indicating that the target BWP or the current UE is in the in-sync state has been received from the low layer, determining that the radio link corresponding to the target BWP is in the in-sync state.

Here, whether the received quality of the reference signal meets the predetermined condition may be determined in accordance with at least one of an SINR, RSRP, RSRQ and RSSI. For example, when the SINR of the reference signal does not reach a predetermined standard, the received quality may be determined as not meeting the predetermined condition.

Further, the performing the radio link monitoring operation on each target BWP through the counting unit for monitoring the radio link may include performing, through the counting unit, the radio link monitoring operation on each target BWP corresponding to the counting unit.

Further, when a value of the radio link out-of-sync counter reaches the first predetermined threshold, the radio link failure timer which belongs to the same counting unit as the radio link out-of-sync counter may be enabled; and/or during the operation of the radio link failure timer, when a value of the radio link in-sync counter which belongs to the same counting unit as the radio link failure timer reaches the second predetermined threshold, the radio link failure timer may be stopped or reset.

When a value of the radio link failure timer of any counting unit reaches the predetermined threshold, a radio link processing procedure may be performed. The radio link processing procedure may include at least one of: triggering a radio link failure operation; triggering a failure event for the BWP for the radio link monitoring operation; triggering the failure event for the BWP corresponding to the counting unit including the radio link failure timer whose value reaches the predetermined threshold; performing a deactivation procedure, a replacement procedure or a reconfiguration procedure on the BWP corresponding to the counting unit including the radio link failure timer whose value reaches the predetermined threshold; and performing the deactivation procedure, the replacement procedure or the reconfiguration procedure on the BWP for the radio link monitoring operation.

In the embodiments of the present disclosure, the deactivation procedure, the replacement procedure or the reconfiguration procedure may be subsequently performed on the BWP for which the failure event is triggered, or when the failure event is triggered for the BWP, the deactivation procedure, the replacement procedure or the reconfiguration procedure may be on the BWP for the radio link monitoring operation.

Operating Mode #3

There are at least three target BWPs which are divided into at least one first portion and at least one second portion. The first portion may include at least one target BWP, and each target BWP may correspond to one counting unit. The second portion may include at least two target BWPs, and each target BWP may correspond to one counting unit. The performing, by the UE using the counting units, the radio link monitoring operation on the target BWPs corresponding to the counting units may include: during the radio link monitoring operation on each target BWP of the first portion, when a radio link corresponding to a predetermined target BWP is in the out-of-sync state, causing the radio link out-of-sync counter of the counting unit corresponding to the predetermined target BWP to count in a cumulative manner, and/or when the radio link corresponding to the predetermined target BWP is in the in-sync state, causing the radio link in-sync counter of the counting unit corresponding to the predetermined target BWP to count in a cumulative manner; and during the radio link monitoring operation on each target BWP of the second portion, when a radio link corresponding to any one target BWP monitored by the counting unit is in the out-of-sync state, causing the radio link out-of-sync counter of the counting unit corresponding to the target BWP to count in a cumulative manner, and/or when the radio link corresponding to any one target BWP monitored by the counting unit is in the in-sync state, causing the radio link in-sync counter of the counting unit corresponding to the target BWP to count in a cumulative manner.

To be specific, during the radio link monitoring operation on each target BWP of the first portion, the radio link out-of-sync counter of the counting unit corresponding to the predetermined target BWP is merely configured to count the quantity of out-of-sync times when the radio link corresponding to the predetermined target BWP is continuously in the out-of-sync state, and/or the radio link in-sync counter of the counting unit corresponding to the predetermined target BWP is merely configured to count the quantity of in-sync times when the radio link corresponding to the predetermined target BWP is continuously in the in-sync state.

When the radio link is continuously in the out-of-sync state, it means that there is no in-sync state between two out-of-sync states. When the radio link is in the in-sync state after being in the out-of-sync state, the radio link out-of-sync counter for counting the quantity of the out-of-sync times of the radio link needs to be restarted.

When the radio link is continuously in the in-sync state, it means that there is no out-of-sync state between two in-sync states. When the radio link is in the out-of-sync state after being in the in-sync state, the radio link in-sync counter for counting the quantity of the in-sync times of the radio link needs to be restarted.

To be specific, during the radio link monitoring operation on each target BWP of the second portion, the radio link out-of-sync counter of the counting unit corresponding to each target BWP is merely configured to count the quantity of out-of-sync times when the radio link corresponding to the target BWP itself is continuously in the out-of-sync state, and/or the radio link in-sync counter of the counting unit corresponding to each target BWP is merely configured to count the quantity of in-sync times when the radio link corresponding to the target BWP itself is continuously in the in-sync state.

Further, when a value of the radio link out-of-sync counter reaches the first predetermined threshold, the radio link failure timer which belongs to the same counting unit as the radio link out-of-sync counter may be enabled. During the operation of the radio link failure timer, when a value of the radio link in-sync counter which belongs to the same counting unit as the radio link failure timer reaches the second predetermined threshold, the radio link failure timer may be stopped or reset.

During the radio link monitoring operation on each target BWP of the first portion, when a value of the radio link failure timer of any counting unit reaches the predetermined threshold, a radio link processing procedure may be performed. The radio link processing procedure may include at least one of: trigging a radio link failure operation; triggering a failure event for the BWP corresponding to the counting unit including the radio link failure timer whose value reaches the predetermined threshold; and performing a deactivation procedure, a replacement procedure or a reconfiguration procedure on the BWP for the radio link monitoring operation.

Further, during the radio link monitoring operation on each target BWP of the first portion, when a value of the radio link failure timer corresponding to each counting unit reaches the predetermined threshold, a radio link processing procedure may be performed. The radio link processing procedure may include at least one of: trigging a radio link failure operation; performing a deactivation procedure, a replacement procedure or a reconfiguration procedure on the BWP for the radio link monitoring operation; and triggering a failure event for the BWP for the radio link monitoring operation.

During the radio link monitoring operation on each target BWP of the second portion, when a value of the radio link failure timer corresponding to each counting unit reaches the predetermined threshold, a radio link processing procedure may be performed. The radio link processing procedure may include at least one of: trigging a radio link failure operation; triggering a failure event for the BWP for the radio link monitoring operation; triggering a failure event for the BWP corresponding to the counting unit including the radio link failure timer whose value reaches the predetermined threshold; performing a deactivation procedure, a replacement procedure or a reconfiguration procedure on the BWP corresponding to the counting unit including the radio link failure timer whose value reaches the predetermined threshold; and performing the deactivation procedure, the replacement procedure or the reconfiguration procedure on the BWP for the radio link monitoring operation.

It can be seen that, the Operating mode #3 is a combination of the Operating mode #1 and the Operating mode #2. The principle has already been described hereinabove, and thus will not be particularly defined herein.

In addition, in the method, the UE may further perform the deactivation procedure, the replacement procedure or the reconfiguration procedure on the BWP in accordance with an indication from the network device.

For example, the method may further include: receiving indication information from the network device, the indication information being carried in an RRC message and including at least one of indication information for deactivating one or more BWPs for the radio link monitoring operation, and indication information for deactivating one or more BWPs for the radio link monitoring operation and activating one or more BWPs for the radio link monitoring operation; and performing at least one of the following processings in accordance with the indication information: resetting at least one of the radio link in-sync counter, the radio link out-of-sync counter and the radio link failure timer of the counting unit corresponding to each to-be-deactivated BWP, or not resetting any one of the radio link in-sync counter, the radio link out-of-sync counter and the radio link failure timer of the counting unit corresponding to each to-be-deactivated BWP; stopping the radio link monitoring operation on each to-be-deactivated BWP; and when the radio link monitoring operation is currently being performed on each to-be-deactivated BWP, omitting the indication information.

In actual use, the above processes may be selected according to the practical need. For example, when the counting unit corresponding to the to-be-deactivated BWP further corresponds to the other BWP for the radio link monitoring operation, obviously as an appropriate scheme, the counter and/or timer of the counting unit corresponding to the to-be-activated BWP may be reset during the deactivation procedure.

For another example, in order to ensure the radio link monitoring operation to be normally performed, upon the receipt of indication information indicating that there is one or more to-be-deactivated BWPs, the UE may determine whether the radio link monitoring operation is currently being performed on the one or more to-be-deactivated BWPs. When the radio link monitoring operation is currently being performed on the one or more to-be-deactivated BWPs, the indication information may be omitted. When no radio link monitoring operation is currently being performed on the one or more to-be-deactivated BWPs, the deactivation procedure may be directly initiated for the one or more BWPs.

It should be appreciated that, the deactivation procedure on the BWP is a known function. In actual use, the UE may not initiate the radio link monitoring operation on the BWP which has been deactivated. However, when a BWP on which the radio link monitoring operation is currently being performed is deactivated, the radio link monitoring operation on the BWP needs to be completed preferentially.

In addition, in a possible embodiment of the present disclosure, after stopping the radio link monitoring operation on the to-be-deactivated BWP in accordance with the indication information, the UE may select one BWP in accordance with a predetermined rule, and then perform the radio link monitoring operation on the selected BWP through the counting unit corresponding to the to-be-deactivated BWP or through the counting unit corresponding to the selected BWP.

Obviously, on the basis of the above design, during the radio link monitoring operation on the to-be-deactivated BWP, the UE may replace the to-be-deactivated BWP with another BWP for the radio link monitoring operation, so as to perform the radio link monitoring operation normally.

In actual use, the selected BWP may be located adjacent to the to-be-deactivated BWP to be replaced by the selected BWP in a frequency band and/or slot, so as to cause the radio link monitoring operation on the selected BWP to be equivalent to or approximately equivalent to the radio link monitoring operation on the to-be-deactivated BWP in terms of a monitoring effect.

In addition, the indication information may include at least one of indication information for replacing or reconfiguring one or more BWPs for the radio link monitoring operation, and indication information for replacing or reconfiguring one or more BWPs for the radio link monitoring operation and one or more replaced or reconfigured BWPs for the radio link monitoring operation. The UE may further perform at least of the following processings in accordance with the indication information: resetting at least one of the radio link in-sync counter, the radio link out-of-sync counter and the radio link failure timer of the counting unit corresponding to the to-be-replaced or to-be-reconfigured BWP, or not resetting any one of the radio link in-sync counter, the radio link out-of-sync counter and the radio link failure timer of the counting unit corresponding to the to-be-replaced or to-be-reconfigured BWP; stopping the radio link monitoring operation on the to-be-replaced or to-be-reconfigured BWP; and performing the radio link monitoring operation on the replaced or reconfigured BWP.

Illustratively, in actual use, when a BWP is reconfigured, it means that a radio link monitoring parameter may be reconfigured for the BWP. The radio link monitoring parameter may include a reference used for the radio link monitoring operation, e.g., a CSI-RS and/or an SS block. The radio link monitoring parameter may further include the first predetermined threshold and/or the second predetermined threshold, and the predetermined threshold for the counting unit mentioned hereinabove.

Further, after performing the radio link monitoring operation on the to-be-replaced or to-be-reconfigured BWP in accordance with the indication information, one BWP may be selected in accordance with the predetermined rule. Then, the radio link monitoring operation may be performed on the selected BWP through the counting unit corresponding to the to-be-replaced or to-be-reconfigured BWP or the counting unit corresponding to the selected BWP.

The radio link monitoring method will be described hereinafter in more details in conjunction with different implementation modes.

Implementation Mode #1

In this implementation mode, the UE merely needs to perform the radio link monitoring operation on one BWP.

Scheme #1: during the radio link monitoring operation, when any BWP is replaced or deactivated (i.e., the BWP on which the radio link monitoring operation is to be stopped), the other BWP is activated (the BWP on which the radio link monitoring operation needs to be performed), or the radio link monitoring parameter of any BWP is reconfigured, all of the radio link in-sync counter, the radio link out-of-sync counter and the radio link failure timer of the corresponding counting unit may be reset.

Scheme #2: during the radio link monitoring operation, when any BWP is replaced or deactivated, the other BWP is activated, or the radio link monitoring parameter of any BWP is reconfigured, a part of the radio link in-sync counter, the radio link out-of-sync counter and the radio link failure timer of the corresponding counting unit may be reset, e.g., merely one of the radio link in-sync counter, the radio link out-of-sync counter and the radio link failure timer may be reset.

Scheme #3: during the radio link monitoring operation, when any BWP is replaced or deactivated, the other BWP is activated, or the radio link monitoring parameter of any BWP is reconfigured, the radio link in-sync counter, the radio link out-of-sync counter and the radio link failure timer of the corresponding counting unit may be maintained, i.e., may not be reset.

In the Implementation mode #1, for Schemes 1 to 3, when the value of the radio link failure timer reaches the predetermined threshold, at least one of the subsequent behaviors may be performed: 1) triggering a radio link failure (RLF) operation; and 2) triggering a deactivation procedure or a replacement procedure on the BWP for the radio link monitoring operation.

Implementation Mode #2

In this implementation mode, the UE needs to perform the radio link monitoring operation on a plurality of BWPs.

Scheme #4: different counting units may be used for the plurality of BWPs for the radio link monitoring operation.

The network device may configure the counting unit for each BWP in accordance with the configuration information, including a value "N" of the radio link out-of-sync counter, a value "M" of the radio link in-sync counter and the predetermined threshold "T1" of the radio link failure timer of each counting unit.

The UE may perform the radio link monitoring operation on each BWP. For example, when an intensity of the reference signal measured at the BWP1 does not meet a predetermined condition, the UE may notify an upper layer of a Quality of Service (QoS) indication through a physical layer, the value of the radio link out-of-sync counter corresponding to the BWP1 may be incremented by 1, and the radio link in-sync counter corresponding to the BWP1 may be reset.

Identically, the radio link in-sync counter and the radio link failure timer may operate separately at the corresponding BWP.

For example, when the intensity of the reference signal measured at the BWP1 meets the predetermined condition, UE may notify the upper layer of an IS indication through the physical layer, the radio link in-sync counter corresponding to the BWP1 may be incremented by 1, and the radio link out-of-sync counter corresponding to the BWP1 may be reset.

Identically, the BWPs may not be differentiated from each other for the radio link failure timer, and the radio link failure timer may be started as long as the value of the radio link out-of-sync counter has successfully counted to N. After the value of the radio link in-sync counter has counted to M, the radio link failure timer may be stopped and reset.

In Scheme #4, when the value of the radio link failure timer corresponding to a certain BWP reaches T1, at least one of the following behaviors may be performed subsequently: 1) triggering, by the UE, the radio link failure (RLF) operation; 2) triggering, by the UE, a failure event for the BWP (i.e., BWP failure (BWPF), at this time, the 5G communication system may process the BWP for which the failure event has been triggered); and 3) directly triggering, by the UE, the deactivation procedure or the replacement procedure on the BWP.

In Scheme #4, when the value of each radio link failure timer for each BWP reaches T1, at least one of the following behaviors may be performed subsequently: 1) triggering, by the UE, the radio link failure (RLF) operation; and 2) triggering, by the UE, the deactivation procedure or the replacement procedure on all the BWPs.

Further, Scheme #4 may be combined with Scheme #1 in the Implementation mode #1. In other words, when any BWP is replaced or deactivated, the other BWP is activated, or the radio link monitoring parameter of any BWP is reconfigured, at least a part of the radio link in-sync counter, the radio link out-of-sync counter and the radio link failure timer of the corresponding counting unit may be reset.

Scheme #5: the UE may perform the radio link monitoring operation on a plurality of BWPs through one counting unit.

The network device may configure a value "N" of a same radio link out-of-sync counter, a value "M" of a same radio link in-sync counter and a predetermined threshold "T1" of a same radio link failure timer for all the BWPs.

For example, when the intensity of the reference signal measured at the BWP1 does not meet the predetermined condition, the UE may notify the upper layer of a QoS indication through the physical layer, the value of the unique radio link out-of-sync counter corresponding to the BWP1 may be incremented by 1, and the radio link in-sync counter may be reset. When the intensity of the reference signal measured at the BWPs is smaller than a predetermined threshold, the UE may notify the upper layer of a QoS indication through the physical layer, the value of the corresponding radio link out-of-sync counter may be incremented by 1, and the radio link in-sync counter may be reset.

Identically, the BWPs may not be differentiated from each other for the radio link in-sync counter. The value of radio link in-sync counter may be incremented by 1, and the radio link out-of-sync may be reset as long as the UE has notified the high layer of the IS indication through the physical layer.

Identically, the BWPs may not be differentiated from each other for the radio link failure timer, and the radio link failure timer may be started as long as the value of the radio link out-of-sync counter has successfully counted to N. After the value of the radio link in-sync counter has counted to M, the radio link failure timer may be stopped and reset.

In Scheme #5, when the value of the radio link failure timer reaches T1, at least one of the following behaviors may be performed subsequently: 1) triggering, by the UE, the radio link failure (RLF) operation; 2) triggering, by the UE, a failure event for at least a part of the BWPs (i.e., BWP failure (BWPF), at this time, the 5G communication system may process the BWPs for which the failure event has been triggered); and 3) triggering, by the UE, the deactivation procedure or the replacement procedure on at least a part of the BWPs.

Further, Scheme #5 may be combined with Scheme #1 in the Implementation mode #1. In other words, when any BWP is replaced or deactivated, the other BWP is activated, or the radio link monitoring parameter of any BWP is reconfigured, at least a part of the radio link in-sync counter, the radio link out-of-sync counter and the radio link failure timer of the counting unit may be reset.

Scheme #6: the UE may perform the radio link monitoring operation on a plurality of BWPs, one counting unit may be used for several predetermined or pre-configured BWPs, and another counting unit may be used for the other predetermined or pre-configured BWPs.

For example, a same counting unit may be used for the BWPs belonging to a same CC, and different counting units may be used for the BWPs belonging to different CCs.

In Scheme #6, when the value of the corresponding radio link failure timer reaches T1, the behaviors in Scheme #4 and Scheme #5 may be performed subsequently.

Further, Scheme #6 may be combined with Scheme #1 in the Implementation mode #1. In other words, when any BWP is replaced or deactivated, the other BWP is activated, or the radio link monitoring parameter of any BWP is reconfigured, at least a part of the radio link in-sync counter, the radio link out-of-sync counter and the radio link failure timer of the counting unit may be reset.

Implementation Mode #3

In this implementation mode, each BWP for the radio link monitoring operation may be deactivated through an RRC message.

Scheme #7: when the to-be-deactivated BWPs for the radio link monitoring operations have been determined by the UE in accordance with the RRC message, one of the following behaviors may be performed subsequently: 1) resetting all of or a part of the radio link in-sync counter, the radio link out-of-sync counter and the radio link failure timer of the counting unit corresponding to each to-be-deactivated BWP for the radio link monitoring operation; 2) searching, by the UE, one substitutive BWP for the radio link monitoring operation in accordance with a predetermined rule, and executing all the schemes in the Implementation mode #1 when the BWP is replaced (the predetermined rule may be configured by the network device, or by the UE itself); and 3) not allowing, by the UE, the deactivation procedure on the BWP on which the radio link monitoring operation is currently being performed, and upon the receipt of the RRC message carrying the indication information indicating that the BWP on which the radio link monitoring operation is currently being performed is to be deactivated, omitting the indication information in the RRC message.

Figure 2:
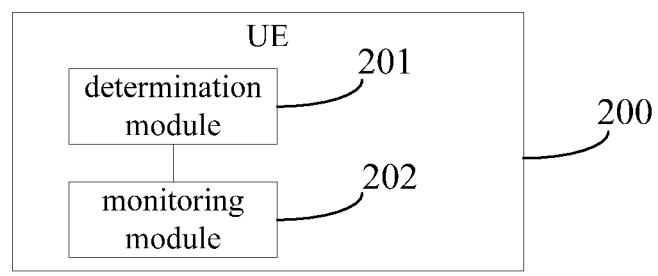
FIG. 2 is a schematic view showing a UE according to some embodiments of the present disclosure.

As shown in FIG. 2, the present disclosure further provides in some embodiments a UE, including: a determination module 201 configured to determine configuration information for performing a radio link monitoring operation on one or more BWPs of a system bandwidth; and a monitoring module 202 configured to perform the radio link monitoring operation on one or more target BWPs in accordance with the configuration information, the one or more target BWPs belonging to the one or more BWPs.

The determination module may include: a first determination sub-module configured to determine the configuration information for performing the radio link monitoring operation on the one or more BWPs in accordance with a predefined protocol; and/or a second determination sub-module configured to determine the configuration information for performing the radio link monitoring operation on the one or more BWPs in accordance with a configuration configured by a network device.

The monitoring module is configured to perform the radio link monitoring operation on the one or more target BWPs through one or more counting units for the radio link monitoring operation. Each counting unit may include a radio link in-sync counter, a radio link out-of-sync counter and a radio link failure timer.

Illustratively, there may exist at least one target BWP, and the counting units may correspond to the target BWPs respectively.

Figure 3:
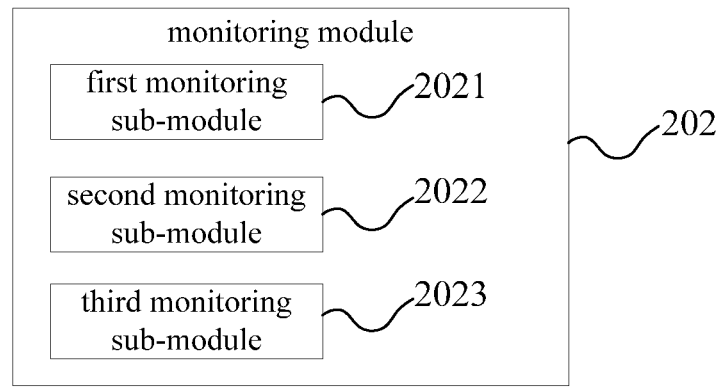
FIG. 3 is a schematic view showing a monitoring module in the UE according to some embodiments of the present disclosure.

As shown in FIG. 3, the monitoring module 202 may include a first monitoring sub-module 2021 configured to perform, through each counting unit, the radio link monitoring operation on the target BWP corresponding to the counting unit. The first monitoring sub-module 2021 is further configured to: during the radio link monitoring operation, when a radio link corresponding to a predetermined target BWP is in an out-of-sync state, cause the radio link out-of-sync counter of the counting unit corresponding to the predetermined target BWP to count in a cumulative manner; and/or when the radio link corresponding to the predetermined target BWP is in an in-sync state, cause the radio link in-sync counter of the counting unit corresponding to the predetermined target BWP to count in a cumulative manner.

The radio link out-of-sync counter of the counting unit corresponding to the predetermined target BWP is merely configured to count the quantity of out-of-sync times when the radio link corresponding to the predetermined target BWP is continuously in the out-of-sync state, and/or the radio link in-sync counter of the counting unit corresponding to the predetermined target BWP is merely configured to count the quantity of in-sync times when the radio link corresponding to the predetermined target BWP is continuously in the in-sync state.

When the radio link is continuously in the out-of-sync state, it means that there is no in-sync state between two out-of-sync states. When the radio link is in the in-sync state after being in the out-of-sync state, the radio link out-of-sync counter for counting the quantity of the out-of-sync times of the radio link needs to be restarted.

When the radio link is continuously in the in-sync state, it means that there is no out-of-sync state between two in-sync states. When the radio link is in the out-of-sync state after being in the in-sync state, the radio link in-sync counter for counting the quantity of the in-sync times of the radio link needs to be restarted.

The first monitoring sub-module 2021 is further configured to: when a value of the radio link out-of-sync counter reaches a first predetermined threshold, start the radio link failure timer which belongs to the same counting unit as the radio link out-of-sync counter; and/or during the operation of the radio link failure timer, when a value of the radio link in-sync counter which belongs to the same counting unit as the radio link failure timer reaches a second predetermined threshold, stop or reset the radio link failure timer.

The first monitoring sub-module 2021 is further configured to, when a value of the radio link failure timer of any counting unit reaches a predetermined threshold, perform a radio link processing procedure. The radio link processing procedure may include at least one of: trigging a radio link failure operation; performing a deactivation procedure, a replacement procedure or a reconfiguration procedure on the BWP for the radio link monitoring operation; triggering a failure event for the BWP for the radio link monitoring operation; performing the deactivation procedure, the replacement procedure or the reconfiguration procedure on the BWP corresponding to the counting unit including the radio link failure timer whose value reaches the predetermined threshold; and triggering the failure event for the BWP corresponding to the counting unit including the radio link failure timer whose value reaches the predetermined threshold.

The first monitoring sub-module 2021 is further configured to, when the value of each radio link failure timer corresponding to each counting unit reaches the predetermined threshold, perform a radio link processing procedure. The radio link processing procedure may include at least one of: triggering the radio link failure operation; performing the deactivation procedure, the replacement procedure or the reconfiguration procedure on the BWP for the radio link monitoring operation; and triggering the failure event for one or more BWPs monitored by the radio link monitoring operation.

Illustratively, there may exist at least two target BWPs corresponding to one counting unit.

As shown in FIG. 3, the monitoring module 202 may further include a second monitoring sub-module 2022 configured to perform, through the counting unit, the radio link monitoring operation on each target BWP corresponding to the counting unit. The second monitoring sub-module 2022 is further configured to: during the radio link monitoring operation, when a radio link corresponding to any one target BWP monitored by the counting unit is in the out-of-sync state, cause the radio link out-of-sync counter of the counting unit to count in a cumulative manner; and/or when the radio link corresponding to any one target BWP monitored by the counting unit is in the in-sync state, cause the radio link in-sync counter of the counting unit to count in a cumulative manner.

The radio link out-of-sync counter of the counting unit corresponding to each target BWP is merely configured to count the quantity of out-of-sync times when the radio link corresponding to the target BWP itself is continuously in the out-of-sync state, and/or the radio link in-sync counter of the counting unit corresponding to each target BWP is merely configured to count the quantity of in-sync times when the radio link corresponding to the target BWP itself is continuously in the in-sync state.

When the radio link is continuously in the out-of-sync state, it means that there is no in-sync state between two out-of-sync states. When the radio link is in the in-sync state after being in the out-of-sync state, the radio link out-of-sync counter for counting the quantity of the out-of-sync times of the radio link needs to be restarted.

When the radio link is continuously in the in-sync state, it means that there is no out-of-sync state between two in-sync states. When the radio link is in the out-of-sync state after being in the in-sync state, the radio link in-sync counter for counting the quantity of the in-sync times of the radio link needs to be restarted.

The second monitoring sub-module 2022 is further configured to: when the value of the radio link out-of-sync counter reaches the first predetermined threshold, start the radio link failure timer which belongs to the same counting unit as the radio link out-of-sync counter; and/or during the operation of the radio link failure timer, when the value of the radio link in-sync counter which belongs to the same counting unit as the radio link failure timer reaches the second predetermined threshold, stop or reset the radio link failure timer.

The second monitoring sub-module 2022 is further configured to, when the value of the radio link failure timer of any counting unit reaches the predetermined threshold, perform a radio link processing procedure. The radio link processing procedure may include at least one of: trigging the radio link failure operation; triggering the failure event for one or more BWPs monitored by the radio link monitoring operation; triggering the failure event for the BWP corresponding to the counting unit including the radio link failure timer whose value reaches the predetermined threshold; performing the deactivation procedure, the replacement procedure or the reconfiguration procedure on the BWP corresponding to the counting unit including the radio link failure timer whose value reaches the predetermined threshold; and performing the deactivation procedure, the replacement procedure or the reconfiguration procedure on the BWP for the radio link monitoring operation.

Illustratively, there may exist at least three target BWPs which are divided into at least one first portion and at least one second portion. The first portion may include at least one target BWP, and each target BWP may correspond to one counting unit. The second portion may include at least two target BWPs, and each target BWP may correspond to one counting unit.

As shown in FIG. 3, the monitoring module 202 may further include a third monitoring sub-module 2023 configured to perform, through each counting unit, the radio link monitoring operation on the target BWP corresponding to the counting unit. The third monitoring sub-module 2023 is further configured to: during the radio link monitoring operation on each target BWP of the first portion, when a radio link corresponding to a predetermined target BWP is in the out-of-sync state, cause the radio link out-of-sync counter of the counting unit corresponding to the predetermined target BWP to count in a cumulative manner, and/or when the radio link corresponding to the predetermined target BWP is in the in-sync state, cause the radio link in-sync counter of the counting unit corresponding to the predetermined target BWP to count in a cumulative manner; and during the radio link monitoring operation on each target BWP of the second portion, when a radio link corresponding to any one target BWP monitored by the counting unit is in the out-of-sync state, cause the radio link out-of-sync counter of the counting unit corresponding to the target BWP to count in a cumulative manner, and/or when the radio link corresponding to any one target BWP monitored by the counting unit is in the in-sync state, cause the radio link in-sync counter of the counting unit corresponding to the target BWP to count in a cumulative manner.

During the radio link monitoring operation on each target BWP of the first portion, the radio link out-of-sync counter of the counting unit corresponding to the predetermined target BWP is merely configured to count the quantity of out-of-sync times when the radio link corresponding to the predetermined target BWP is continuously in the out-of-sync state, and/or the radio link in-sync counter of the counting unit corresponding to the predetermined target BWP is merely configured to count the quantity of in-sync times when the radio link corresponding to the predetermined target BWP is continuously in the in-sync state.

During the radio link monitoring operation on each target BWP of the second portion, the radio link out-of-sync counter of the counting unit corresponding to each target BWP is merely configured to count the quantity of out-of-sync times when the radio link corresponding to the target BWP itself is continuously in the out-of-sync state, and/or the radio link in-sync counter of the counting unit corresponding to each target BWP is merely configured to count the quantity of in-sync times when the radio link corresponding to the target BWP itself is continuously in the in-sync state.

When the radio link is continuously in the out-of-sync state, it means that there is no in-sync state between two out-of-sync states. When the radio link is in the in-sync state after being in the out-of-sync state, the radio link out-of-sync counter for counting the quantity of the out-of-sync times of the radio link needs to be restarted.

When the radio link is continuously in the in-sync state, it means that there is no out-of-sync state between two in-sync states. When the radio link is in the out-of-sync state after being in the in-sync state, the radio link in-sync counter for counting the quantity of the in-sync times of the radio link needs to be restarted.

The third monitoring sub-module 2023 is further configured to: when the value of the radio link out-of-sync counter reaches the first predetermined threshold, start the radio link failure timer which belongs to the same counting unit as the radio link out-of-sync counter; and during the operation of the radio link failure timer, when the value of the radio link in-sync counter which belongs to the same counting unit as the radio link failure timer reaches the second predetermined threshold, stop or reset the radio link failure timer.

The third monitoring sub-module 2023 is further configured to, during the radio link monitoring operation on each target BWP of the first portion, when the value of the radio link failure timer of any counting unit reaches the predetermined threshold, perform a radio link processing procedure. The radio link processing procedure may include at least one of: trigging the radio link failure operation; triggering the failure event for one or more BWPs monitored by the radio link monitoring operation; triggering the failure event for the BWP corresponding to the counting unit including the radio link failure timer whose value reaches the predetermined threshold; performing the deactivation procedure, the replacement procedure or the reconfiguration procedure on the BWP corresponding to the counting unit including the radio link failure timer whose value reaches the predetermined threshold; and performing the deactivation procedure, the replacement procedure or the reconfiguration procedure on the BWP for the radio link monitoring operation.

The third monitoring sub-module 2023 is further configured to, during the radio link monitoring operation on each target BWP of the first portion, when the value of the radio link failure timer corresponding to each counting unit reaches the predetermined threshold, perform a radio link processing procedure. The radio link processing procedure may include at least one of: trigging the radio link failure operation; performing the deactivation procedure, the replacement procedure or the reconfiguration procedure on the BWP for the radio link monitoring operation; and triggering the failure event for one or more BWPs monitored by the radio link monitoring operation.

The third monitoring sub-module 2023 is further configured to, during the radio link monitoring operation on each target BWP of the second portion, when the value of the radio link failure timer corresponding to each counting unit reaches the predetermined threshold, preform a radio link processing procedure. The radio link processing procedure may include at least one of: trigging the radio link failure operation; triggering the failure event for one or more BWPs monitored by the radio link monitoring operation; triggering the failure event for the BWP corresponding to the counting unit including the radio link failure timer whose value reaches the predetermined threshold; performing the deactivation procedure, the replacement procedure or the reconfiguration procedure on the BWP corresponding to the counting unit including the radio link failure timer whose value reaches the predetermined threshold; and performing the deactivation procedure, the replacement procedure or the reconfiguration procedure on the BWP for the radio link monitoring operation.

The UE may further include a timeout processing module configured to: when the failure event is triggered for each BWP, perform the deactivation procedure, the replacement procedure or the reconfiguration procedure on the BWP for which the failure event is triggered; and when the failure event is triggered for each BWP, perform the deactivation procedure, the replacement procedure or the reconfiguration procedure on the BWP for the radio link monitoring operation.

When determining that the radio link corresponding to each target BWP is in the out-of-sync state, each of the first monitoring sub-module 2021, the second monitoring sub-module 2022 and the third monitoring sub-module 2023 is further configured to, when received quality of a reference signal for the target BWP does not meet a predetermined condition and/or when an indication indicating that the target BWP or the current UE is in the out-of-sync state has been received from a low layer, determine that the radio link corresponding to the target BWP is in the out-of-sync state. When determining that the radio link corresponding to each target BWP is in the in-sync state, each of the first monitoring sub-module 2021, the second monitoring sub-module 2022 and the third monitoring sub-module 2023 is further configured to, when the received quality of the reference signal for the target BWP meets the predetermined condition and/or when an indication indicating that the target BWP or the current UE is in the in-sync state has been received from the low layer, determine that the radio link corresponding to the target BWP is in the in-sync state.

In addition, the UE may further include: a first reception module configured to receive indication information from the network device, the indication information including at least one of indication information for deactivating one or more BWPs for the radio link monitoring operation, and indication information for deactivating one or more BWPs for the radio link monitoring operation and activating one or more BWPs for the radio link monitoring operation; and a first execution module configured to perform at least one of the following processings in accordance with the indication information: resetting at least one of the radio link in-sync counter, the radio link out-of-sync counter and the radio link failure timer of the counting unit corresponding to each to-be-deactivated BWP, or not resetting any one of the radio link in-sync counter, the radio link out-of-sync counter and the radio link failure timer of the counting unit corresponding to each to-be-deactivated BWP; stopping the radio link monitoring operation on each to-be-deactivated BWP; and when the radio link monitoring operation is currently being performed on each to-be-deactivated BWP, omitting the indication information.

The first execution module is further configured to: after stopping the radio link monitoring operation on the to-be-deactivated BWP in accordance with the indication information, select one BWP in accordance with a predetermined rule; and perform the radio link monitoring operation on the selected BWP through the counting unit corresponding to the to-be-deactivated BWP or through the counting unit corresponding to the selected BWP.

In addition, the UE may further include: a second reception module configured to receive indication information from the network device, the indication information including one of indication information for replacing or reconfiguring one or more BWPs for the radio link monitoring operation, and indication information for replacing or reconfiguring one or more BWPs for the radio link monitoring operation and one or more replaced or reconfigured BWPs for the radio link monitoring operation; and a second execution module configured to perform at least of the following processings in accordance with the indication information: resetting at least one of the radio link in-sync counter, the radio link out-of-sync counter and the radio link failure timer of the counting unit corresponding to the to-be-replaced or to-be-reconfigured BWP, or not resetting any one of the radio link in-sync counter, the radio link out-of-sync counter and the radio link failure timer of the counting unit corresponding to the to-be-replaced or to-be-reconfigured BWP; stopping the radio link monitoring operation on the to-be-replaced or to-be-reconfigured BWP; and performing the radio link monitoring operation on the replaced or reconfigured BWP.

The second execution module is further configured to: after performing the radio link monitoring operation on the to-be-replaced or to-be-reconfigured BWP in accordance with the indication information, select one BWP in accordance with the predetermined rule; and perform the radio link monitoring operation on the selected BWP through the counting unit corresponding to the to-be-replaced or to-be-reconfigured BWP or the counting unit corresponding to the selected BWP.

Figure 4:
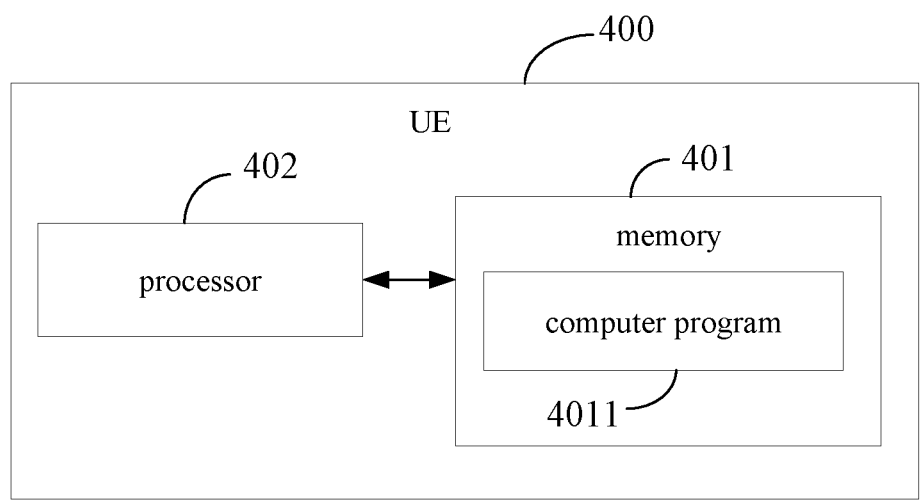
FIG. 4 is another schematic view showing the UE according to some embodiments of the present disclosure.

As shown in FIG. 4, the present disclosure further provides in some embodiments a UE 400, including a memory 401, a processor 402, and a computer program 4011 stored in the memory 401 and executed by the processor 402. The processor 402 is configured to execute the computer program so as to: determine configuration information for performing a radio link monitoring operation on one or more BWPs of a system bandwidth; and perform the radio link monitoring operation on one or more target BWPs in accordance with the configuration information, the one or more target BWPs belonging to the one or more BWPs.

It should be appreciated that, the memory 401 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but non-restrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 401 intends to include, but not limited to, the above-mentioned and any other appropriate memories.

To be specific, the processor 402 is further configured to execute the computer program so as to: determine the configuration information for performing the radio link monitoring operation on the one or more BWPs in accordance with a predefined protocol; and/or determine the configuration information for performing the radio link monitoring operation on the one or more BWPs in accordance with a configuration configured by a network device.

To be specific, the processor 402 is further configured to execute the computer program so as to perform the radio link monitoring operation on the one or more target BWPs through one or more counting units for the radio link monitoring operation. Each counting unit may include a radio link in-sync counter, a radio link out-of-sync counter and a radio link failure timer.

In a possible embodiment of the present disclosure, there may exist at least one target BWP, and the counting units may correspond to the target BWPs respectively. The processor 402 is further configured to execute the computer program so as to: perform, through each counting unit, the radio link monitoring operation on the target BWP corresponding to the counting unit. To be specific, the processor 402 is further configured to execute the computer program so as to: during the radio link monitoring operation, when a radio link corresponding to a predetermined target BWP is in an out-of-sync state, cause the radio link out-of-sync counter of the counting unit corresponding to the predetermined target BWP to count in a cumulative manner; and/or when the radio link corresponding to the predetermined target BWP is in an in-sync state, cause the radio link in-sync counter of the counting unit corresponding to the predetermined target BWP to count in a cumulative manner.

The radio link out-of-sync counter of the counting unit corresponding to the predetermined target BWP is merely configured to count the quantity of out-of-sync times when the radio link corresponding to the predetermined target BWP is continuously in the out-of-sync state, and/or the radio link in-sync counter of the counting unit corresponding to the predetermined target BWP is merely configured to count the quantity of in-sync times when the radio link corresponding to the predetermined target BWP is continuously in the in-sync state.

In a possible embodiment of the present disclosure, the processor 402 is further configured to execute the computer program so as to, when a value of the radio link failure timer of any counting unit reaches a predetermined threshold, perform a radio link processing procedure. The radio link processing procedure may include at least one of: trigging a radio link failure operation; performing a deactivation procedure, a replacement procedure or a reconfiguration procedure on the BWP for the radio link monitoring operation; triggering a failure event for the BWP for the radio link monitoring operation; performing the deactivation procedure, the replacement procedure or the reconfiguration procedure on the BWP corresponding to the counting unit including the radio link failure timer whose value reaches the predetermined threshold; and triggering the failure event for the BWP corresponding to the counting unit including the radio link failure timer whose value reaches the predetermined threshold.

In a possible embodiment of the present disclosure, the processor 402 is further configured to execute the computer program so as to, when the value of each radio link failure timer corresponding to each counting unit reaches the predetermined threshold, perform a radio link processing procedure. The radio link processing procedure may include at least one of: triggering the radio link failure operation; performing the deactivation procedure, the replacement procedure or the reconfiguration procedure on the BWP for the radio link monitoring operation; and triggering the failure event for one or more BWPs monitored by the radio link monitoring operation.

In a possible embodiment of the present disclosure, there may exist at least two target BWPs corresponding to one counting unit. The processor 402 is further configured to execute the computer program so as to perform, through the counting unit, the radio link monitoring operation on each target BWP corresponding to the counting unit. To be specific, the processor 402 is further configured to execute the computer program so as to: during the radio link monitoring operation, when a radio link corresponding to any one target BWP monitored by the counting unit is in the out-of-sync state, cause the radio link out-of-sync counter of the counting unit to count in a cumulative manner; and/or when the radio link corresponding to any one target BWP monitored by the counting unit is in the in-sync state, cause the radio link in-sync counter of the counting unit to count in a cumulative manner.

The radio link out-of-sync counter of the counting unit corresponding to each target BWP is merely configured to count the quantity of out-of-sync times when the radio link corresponding to the target BWP itself is continuously in the out-of-sync state, and/or the radio link in-sync counter of the counting unit corresponding to each target BWP is merely configured to count the quantity of in-sync times when the radio link corresponding to the target BWP itself is continuously in the in-sync state.

In a possible embodiment of the present disclosure, the processor 402 is further configured to execute the computer program so as to, when the value of the radio link failure timer of any counting unit reaches the predetermined threshold, perform a radio link processing procedure. The radio link processing procedure may include at least one of: trigging the radio link failure operation; triggering the failure event for one or more BWPs monitored by the radio link monitoring operation; triggering the failure event for the BWP corresponding to the counting unit including the radio link failure timer whose value reaches the predetermined threshold; performing the deactivation procedure, the replacement procedure or the reconfiguration procedure on the BWP corresponding to the counting unit including the radio link failure timer whose value reaches the predetermined threshold; and performing the deactivation procedure, the replacement procedure or the reconfiguration procedure on the BWP for the radio link monitoring operation.

In a possible embodiment of the present disclosure, there may exist at least three target BWPs which are divided into at least one first portion and at least one second portion. The first portion may include at least one target BWP, and each target BWP may correspond to one counting unit. The second portion may include at least two target BWPs, and each target BWP may correspond to one counting unit. The processor 402 is further configured to execute the computer program so as to perform, through each counting unit, the radio link monitoring operation on the target BWP corresponding to the counting unit. To be specific, the processor 402 is further configured to execute the computer program so as to: during the radio link monitoring operation on each target BWP of the first portion, when a radio link corresponding to a predetermined target BWP is in the out-of-sync state, cause the radio link out-of-sync counter of the counting unit corresponding to the predetermined target BWP to count in a cumulative manner, and/or when the radio link corresponding to the predetermined target BWP is in the in-sync state, cause the radio link in-sync counter of the counting unit corresponding to the predetermined target BWP to count in a cumulative manner; and during the radio link monitoring operation on each target BWP of the second portion, when a radio link corresponding to any one target BWP monitored by the counting unit is in the out-of-sync state, cause the radio link out-of-sync counter of the counting unit corresponding to the target BWP to count in a cumulative manner, and/or when the radio link corresponding to any one target BWP monitored by the counting unit is in the in-sync state, cause the radio link in-sync counter of the counting unit corresponding to the target BWP to count in a cumulative manner.

During the radio link monitoring operation on each target BWP of the first portion, the radio link out-of-sync counter of the counting unit corresponding to the predetermined target BWP is merely configured to count the quantity of out-of-sync times when the radio link corresponding to the predetermined target BWP is continuously in the out-of-sync state, and/or the radio link in-sync counter of the counting unit corresponding to the predetermined target BWP is merely configured to count the quantity of in-sync times when the radio link corresponding to the predetermined target BWP is continuously in the in-sync state.

During the radio link monitoring operation on each target BWP of the second portion, the radio link out-of-sync counter of the counting unit corresponding to each target BWP is merely configured to count the quantity of out-of-sync times when the radio link corresponding to the target BWP itself is continuously in the out-of-sync state, and/or the radio link in-sync counter of the counting unit corresponding to each target BWP is merely configured to count the quantity of in-sync times when the radio link corresponding to the target BWP itself is continuously in the in-sync state.

The processor 402 is further configured to execute the computer program so as to: when a value of the radio link out-of-sync counter reaches a first predetermined threshold, start the radio link failure timer which belongs to the same counting unit as the radio link out-of-sync counter; and during the operation of the radio link failure timer, when a value of the radio link in-sync counter which belongs to the same counting unit as the radio link failure timer reaches a second predetermined threshold, stop or reset the radio link failure timer.

In a possible embodiment of the present disclosure, the processor 402 is further configured to execute the computer program so as to, during the radio link monitoring operation on each target BWP of the first portion, when the value of the radio link failure timer of any counting unit reaches the predetermined threshold, perform a radio link processing procedure. The radio link processing procedure may include at least one of: trigging the radio link failure operation; triggering the failure event for the BWP corresponding to the counting unit including the radio link failure timer whose value reaches the predetermined threshold; and performing the deactivation procedure, the replacement procedure or the reconfiguration procedure on the BWP for the radio link monitoring operation.

In a possible embodiment of the present disclosure, the processor 402 is further configured to execute the computer program so as to, during the radio link monitoring operation on each target BWP of the first portion, when the value of the radio link failure timer corresponding to each counting unit reaches the predetermined threshold, perform a radio link processing procedure. The radio link processing procedure may include at least one of: trigging the radio link failure operation; performing the deactivation procedure, the replacement procedure or the reconfiguration procedure on the BWP for the radio link monitoring operation; and triggering the failure event for one or more BWPs monitored by the radio link monitoring operation.

In a possible embodiment of the present disclosure, the processor 402 is further configured to execute the computer program so as to, during the radio link monitoring operation on each target BWP of the second portion, when the value of the radio link failure timer corresponding to each counting unit reaches the predetermined threshold, preform a radio link processing procedure. The radio link processing procedure may include at least one of: trigging the radio link failure operation; triggering the failure event for one or more BWPs monitored by the radio link monitoring operation; triggering the failure event for the BWP corresponding to the counting unit including the radio link failure timer whose value reaches the predetermined threshold; and performing the deactivation procedure, the replacement procedure or the reconfiguration procedure on the BWP corresponding to the counting unit including the radio link failure timer whose value reaches the predetermined threshold.

In a possible embodiment of the present disclosure, the processor 402 is further configured to execute the computer program so as to: when the failure event is triggered for each BWP, perform the deactivation procedure, the replacement procedure or the reconfiguration procedure on the BWP for which the failure event is triggered; and when the failure event is triggered for each BWP, perform the deactivation procedure, the replacement procedure or the reconfiguration procedure on the BWP for the radio link monitoring operation.

In a possible embodiment of the present disclosure, the processor 402 is further configured to execute the computer program so as to: when received quality of a reference signal for the target BWP does not meet a predetermined condition and/or when an indication indicating that the target BWP or the current UE is in the out-of-sync state has been received from a low layer, determine that the radio link corresponding to the target BWP is in the out-of-sync state; and when the received quality of the reference signal for the target BWP meets the predetermined condition and/or when an indication indicating that the target BWP or the current UE is in the in-sync state has been received from the low layer, determine that the radio link corresponding to the target BWP is in the in-sync state.

In a possible embodiment of the present disclosure, the processor 402 is further configured to execute the computer program, so as to: receive indication information from the network device, the indication information including at least one of indication information for deactivating one or more BWPs for the radio link monitoring operation, and indication information for deactivating one or more BWPs for the radio link monitoring operation and activating one or more BWPs for the radio link monitoring operation; and perform at least one of the following processings in accordance with the indication information: resetting at least one of the radio link in-sync counter, the radio link out-of-sync counter and the radio link failure timer of the counting unit corresponding to each to-be-deactivated BWP, or not resetting any one of the radio link in-sync counter, the radio link out-of-sync counter and the radio link failure timer of the counting unit corresponding to each to-be-deactivated BWP; stopping the radio link monitoring operation on each to-be-deactivated BWP; and when the radio link monitoring operation is currently being performed on each to-be-deactivated BWP, omitting the indication information.

In a possible embodiment of the present disclosure, the processor 402 is further configured to execute the computer program so as to: after stopping the radio link monitoring operation on the to-be-deactivated BWP in accordance with the indication information, select one BWP in accordance with a predetermined rule; and perform the radio link monitoring operation on the selected BWP through the counting unit corresponding to the to-be-deactivated BWP or through the counting unit corresponding to the selected BWP.

In a possible embodiment of the present disclosure, the processor 402 is further configured to execute the computer program so as to: receive indication information from the network device, the indication information including one of indication information for replacing or reconfiguring one or more BWPs for the radio link monitoring operation, and indication information for replacing or reconfiguring one or more BWPs for the radio link monitoring operation and one or more replaced or reconfigured BWPs for the radio link monitoring operation; and perform at least of the following processings in accordance with the indication information: resetting at least one of the radio link in-sync counter, the radio link out-of-sync counter and the radio link failure timer of the counting unit corresponding to the to-be-replaced or to-be-reconfigured BWP, or not resetting any one of the radio link in-sync counter, the radio link out-of-sync counter and the radio link failure timer of the counting unit corresponding to the to-be-replaced or to-be-reconfigured BWP; stopping the radio link monitoring operation on the to-be-replaced or to-be-reconfigured BWP; and performing the radio link monitoring operation on the replaced or reconfigured BWP.

In a possible embodiment of the present disclosure, the processor 402 is further configured to execute the computer program so as to: after performing the radio link monitoring operation on the to-be-replaced or to-be-reconfigured BWP in accordance with the indication information, select one BWP in accordance with the predetermined rule; and perform the radio link monitoring operation on the selected BWP through the counting unit corresponding to the to-be-replaced or to-be-reconfigured BWP or the counting unit corresponding to the selected BWP.

The present disclosure further provides in some embodiments a computer-readable storage medium storing therein a computer program. The computer program is executed by a processor so as to: determine configuration information for performing a radio link monitoring operation on one or more BWPs of a system bandwidth; and a monitoring module configured to perform the radio link monitoring operation on one or more target BWPs in accordance with the configuration information, the one or more target BWPs belonging to the one or more BWPs.

In the embodiments of the present disclosure, the computer-readable storage medium may be a volatile or non-volatile computer-readable storage medium.

In a possible embodiment of the present disclosure, the computer program is further executed by the processor so as to: determine the configuration information for performing the radio link monitoring operation on the one or more BWPs in accordance with a predefined protocol; and/or determine the configuration information for performing the radio link monitoring operation on the one or more BWPs in accordance with a configuration configured by a network device.

In a possible embodiment of the present disclosure, the computer program is further executed by the processor so as to: perform the radio link monitoring operation on the one or more target BWPs through one or more counting units for the radio link monitoring operation. Each counting unit may include a radio link in-sync counter, a radio link out-of-sync counter and a radio link failure timer.

In a possible embodiment of the present disclosure, there may exist at least one target BWP, and the counting units may correspond to the target BWPs respectively. The computer program is further executed by the processor so as to: perform, through each counting unit, the radio link monitoring operation on the target BWP corresponding to the counting unit. To be specific, the computer program is further executed by the processor so as to: during the radio link monitoring operation, when a radio link corresponding to a predetermined target BWP is in an out-of-sync state, cause the radio link out-of-sync counter of the counting unit corresponding to the predetermined target BWP to count in a cumulative manner; and/or when the radio link corresponding to the predetermined target BWP is in an in-sync state, cause the radio link in-sync counter of the counting unit corresponding to the predetermined target BWP to count in a cumulative manner.

The radio link out-of-sync counter of the counting unit corresponding to the predetermined target BWP is merely configured to count the quantity of out-of-sync times when the radio link corresponding to the predetermined target BWP is continuously in the out-of-sync state, and/or the radio link in-sync counter of the counting unit corresponding to the predetermined target BWP is merely configured to count the quantity of in-sync times when the radio link corresponding to the predetermined target BWP is continuously in the in-sync state.

The computer program is further executed by the processor so as to: when a value of the radio link out-of-sync counter reaches a first predetermined threshold, start the radio link failure timer which belongs to the same counting unit as the radio link out-of-sync counter; and during the operation of the radio link failure timer, when a value of the radio link in-sync counter which belongs to the same counting unit as the radio link failure timer reaches a second predetermined threshold, stop or reset the radio link failure timer.

In a possible embodiment of the present disclosure, the computer program is further executed by the processor so as to, when a value of the radio link failure timer of any counting unit reaches a predetermined threshold, perform a radio link processing procedure. The radio link processing procedure may include at least one of: trigging a radio link failure operation; performing a deactivation procedure, a replacement procedure or a reconfiguration procedure on the BWP for the radio link monitoring operation; triggering a failure event for the BWP for the radio link monitoring operation; performing the deactivation procedure, the replacement procedure or the reconfiguration procedure on the BWP corresponding to the counting unit including the radio link failure timer whose value reaches the predetermined threshold; and triggering the failure event for the BWP corresponding to the counting unit including the radio link failure timer whose value reaches the predetermined threshold.

In a possible embodiment of the present disclosure, the computer program is further executed by the processor so as to, when the value of each radio link failure timer corresponding to each counting unit reaches the predetermined threshold, perform a radio link processing procedure. The radio link processing procedure may include at least one of: triggering the radio link failure operation; performing the deactivation procedure, the replacement procedure or the reconfiguration procedure on the BWP for the radio link monitoring operation; and triggering the failure event for one or more BWPs monitored by the radio link monitoring operation.

In a possible embodiment of the present disclosure, there may exist at least two target BWPs corresponding to one counting unit. The computer program is further executed by the processor so as to perform, through the counting unit, the radio link monitoring operation on each target BWP corresponding to the counting unit. To be specific, the computer program is further executed by the processor so as to: during the radio link monitoring operation, when a radio link corresponding to any one target BWP monitored by the counting unit is in the out-of-sync state, cause the radio link out-of-sync counter of the counting unit to count in a cumulative manner; and/or when the radio link corresponding to any one target BWP monitored by the counting unit is in the in-sync state, cause the radio link in-sync counter of the counting unit to count in a cumulative manner.

The radio link out-of-sync counter of the counting unit corresponding to each target BWP is merely configured to count the quantity of out-of-sync times when the radio link corresponding to the target BWP itself is continuously in the out-of-sync state, and/or the radio link in-sync counter of the counting unit corresponding to each target BWP is merely configured to count the quantity of in-sync times when the radio link corresponding to the target BWP itself is continuously in the in-sync state.

The computer program is further executed by the processor so as to: when a value of the radio link out-of-sync counter reaches a first predetermined threshold, start the radio link failure timer which belongs to the same counting unit as the radio link out-of-sync counter; and during the operation of the radio link failure timer, when a value of the radio link in-sync counter which belongs to the same counting unit as the radio link failure timer reaches a second predetermined threshold, stop or reset the radio link failure timer.

In a possible embodiment of the present disclosure, the computer program is further executed by the processor so as to, when the value of the radio link failure timer of any counting unit reaches the predetermined threshold, perform a radio link processing procedure. The radio link processing procedure may include at least one of: trigging the radio link failure operation; triggering the failure event for one or more BWPs monitored by the radio link monitoring operation; triggering the failure event for the BWP corresponding to the counting unit including the radio link failure timer whose value reaches the predetermined threshold; performing the deactivation procedure, the replacement procedure or the reconfiguration procedure on the BWP corresponding to the counting unit including the radio link failure timer whose value reaches the predetermined threshold; and performing the deactivation procedure, the replacement procedure or the reconfiguration procedure on the BWP for the radio link monitoring operation.

In a possible embodiment of the present disclosure, there may exist at least three target BWPs which are divided into at least one first portion and at least one second portion. The first portion may include at least one target BWP, and each target BWP may correspond to one counting unit. The second portion may include at least two target BWPs, and each target BWP may correspond to one counting unit. The computer program is further executed by the processor so as to perform, through each counting unit, the radio link monitoring operation on the target BWP corresponding to the counting unit. To be specific, the computer program is further executed by the processor so as to: during the radio link monitoring operation on each target BWP of the first portion, when a radio link corresponding to a predetermined target BWP is in the out-of-sync state, cause the radio link out-of-sync counter of the counting unit corresponding to the predetermined target BWP to count in a cumulative manner, and/or when the radio link corresponding to the predetermined target BWP is in the in-sync state, cause the radio link in-sync counter of the counting unit corresponding to the predetermined target BWP to count in a cumulative manner; and during the radio link monitoring operation on each target BWP of the second portion, when a radio link corresponding to any one target BWP monitored by the counting unit is in the out-of-sync state, cause the radio link out-of-sync counter of the counting unit corresponding to the target BWP to count in a cumulative manner, and/or when the radio link corresponding to any one target BWP monitored by the counting unit is in the in-sync state, cause the radio link in-sync counter of the counting unit corresponding to the target BWP to count in a cumulative manner.

During the radio link monitoring operation on each target BWP of the first portion, the radio link out-of-sync counter of the counting unit corresponding to the predetermined target BWP is merely configured to count the quantity of out-of-sync times when the radio link corresponding to the predetermined target BWP is continuously in the out-of-sync state, and/or the radio link in-sync counter of the counting unit corresponding to the predetermined target BWP is merely configured to count the quantity of in-sync times when the radio link corresponding to the predetermined target BWP is continuously in the in-sync state.

During the radio link monitoring operation on each target BWP of the second portion, the radio link out-of-sync counter of the counting unit corresponding to each target BWP is merely configured to count the quantity of out-of-sync times when the radio link corresponding to the target BWP itself is continuously in the out-of-sync state, and/or the radio link in-sync counter of the counting unit corresponding to each target BWP is merely configured to count the quantity of in-sync times when the radio link corresponding to the target BWP itself is continuously in the in-sync state.

The computer program is further executed by the processor so as to: when a value of the radio link out-of-sync counter reaches a first predetermined threshold, start the radio link failure timer which belongs to the same counting unit as the radio link out-of-sync counter; and during the operation of the radio link failure timer, when a value of the radio link in-sync counter which belongs to the same counting unit as the radio link failure timer reaches a second predetermined threshold, stop or reset the radio link failure timer.

In a possible embodiment of the present disclosure, the computer program is further executed by the processor so as to, during the radio link monitoring operation on each target BWP of the first portion, when the value of the radio link failure timer of any counting unit reaches the predetermined threshold, perform a radio link processing procedure. The radio link processing procedure may include at least one of: trigging the radio link failure operation; triggering the failure event for the BWP corresponding to the counting unit including the radio link failure timer whose value reaches the predetermined threshold; and performing the deactivation procedure, the replacement procedure or the reconfiguration procedure on the BWP for the radio link monitoring operation.

In a possible embodiment of the present disclosure, the computer program is further executed by the processor so as to, during the radio link monitoring operation on each target BWP of the first portion, when the value of the radio link failure timer corresponding to each counting unit reaches the predetermined threshold, perform a radio link processing procedure. The radio link processing procedure may include at least one of: trigging the radio link failure operation;

performing the deactivation procedure, the replacement procedure or the reconfiguration procedure on the BWP for the radio link monitoring operation; and triggering the failure event for one or more BWPs monitored by the radio link monitoring operation.

In a possible embodiment of the present disclosure, the computer program is further executed by the processor so as to, during the radio link monitoring operation on each target BWP of the second portion, when the value of the radio link failure timer corresponding to each counting unit reaches the predetermined threshold, preform a radio link processing procedure. The radio link processing procedure may include at least one of: trigging the radio link failure operation; triggering the failure event for one or more BWPs monitored by the radio link monitoring operation; triggering the failure event for the BWP corresponding to the counting unit including the radio link failure timer whose value reaches the predetermined threshold; performing the deactivation procedure, the replacement procedure or the reconfiguration procedure on the BWP corresponding to the counting unit including the radio link failure timer whose value reaches the predetermined threshold; and performing the deactivation procedure, the replacement procedure or the reconfiguration procedure on the BWP for the radio link monitoring operation.

In a possible embodiment of the present disclosure, the computer program is further executed by the processor so as to: when the failure event is triggered for each BWP, perform the deactivation procedure, the replacement procedure or the reconfiguration procedure on the BWP for which the failure event is triggered; and when the failure event is triggered for each BWP, perform the deactivation procedure, the replacement procedure or the reconfiguration procedure on the BWP for the radio link monitoring operation.

In a possible embodiment of the present disclosure, the computer program is further executed by the processor so as to: when received quality of a reference signal for the target BWP does not meet a predetermined condition and/or when an indication indicating that the target BWP or the current UE is in the out-of-sync state has been received from a low layer, determine that the radio link corresponding to the target BWP is in the out-of-sync state; and/or when the received quality of the reference signal for the target BWP meets the predetermined condition and/or when an indication indicating that the target BWP or the current UE is in the in-sync state has been received from the low layer, determine that the radio link corresponding to the target BWP is in the in-sync state.

In a possible embodiment of the present disclosure, the computer program is further executed by the processor so as to: receive indication information from the network device, the indication information including at least one of indication information for deactivating one or more BWPs for the radio link monitoring operation, and indication information for deactivating one or more BWPs for the radio link monitoring operation and activating one or more BWPs for the radio link monitoring operation; and perform at least one of the following processings in accordance with the indication information: resetting at least one of the radio link in-sync counter, the radio link out-of-sync counter and the radio link failure timer of the counting unit corresponding to each to-be-deactivated BWP, or not resetting any one of the radio link in-sync counter, the radio link out-of-sync counter and the radio link failure timer of the counting unit corresponding to each to-be-deactivated BWP; stopping the radio link monitoring operation on each to-be-deactivated BWP; and when the radio link monitoring operation is currently being performed on each to-be-deactivated BWP, omitting the indication information.

In a possible embodiment of the present disclosure, the computer program is further executed by the processor so as to: after stopping the radio link monitoring operation on the to-be-deactivated BWP in accordance with the indication information, select one BWP in accordance with a predetermined rule; and perform the radio link monitoring operation on the selected BWP through the counting unit corresponding to the to-be-deactivated BWP or through the counting unit corresponding to the selected BWP.

In a possible embodiment of the present disclosure, the computer program is further executed by the processor so as to: receive indication information from the network device, the indication information including one of indication information for replacing or reconfiguring one or more BWPs for the radio link monitoring operation, and indication information for replacing or reconfiguring one or more BWPs for the radio link monitoring operation and one or more replaced or reconfigured BWPs for the radio link monitoring operation; and perform at least of the following processings in accordance with the indication information: resetting at least one of the radio link in-sync counter, the radio link out-of-sync counter and the radio link failure timer of the counting unit corresponding to the to-be-replaced or to-be-reconfigured BWP, or not resetting any one of the radio link in-sync counter, the radio link out-of-sync counter and the radio link failure timer of the counting unit corresponding to the to-be-replaced or to-be-reconfigured BWP; stopping the radio link monitoring operation on the to-be-replaced or to-be-reconfigured BWP; and performing the radio link monitoring operation on the replaced or reconfigured BWP.

In a possible embodiment of the present disclosure, the computer program is further executed by the processor so as to: after performing the radio link monitoring operation on the to-be-replaced or to-be-reconfigured BWP in accordance with the indication information, select one BWP in accordance with the predetermined rule; and perform the radio link monitoring operation on the selected BWP through the counting unit corresponding to the to-be-replaced or to-be-reconfigured BWP or the counting unit corresponding to the selected BWP.

According to the embodiments of the present disclosure, the radio link monitoring operation may be performed with the BWP as granularity. As compared with the conventional radio link monitoring method for the 4G communication system, it is able to perform the radio link monitoring operation in a more accurate manner without any necessity to monitor the radio link at a full frequency band, thereby to prevent the waste of radio resources and reduce the power consumption for the UE during the radio link monitoring operation.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, it may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

It should be further appreciated that, such words as "first" and "second" are merely used to separate one entity or operation from another entity or operation, but are not necessarily used to represent or imply any relation or order between the entities or operations. In addition, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A radio link monitoring method performed by a User Equipment (UE), comprising:
   determining configuration information for performing a radio link monitoring operation on a plurality of Bandwidth Parts (BWPs) of a system bandwidth; and
   performing the radio link monitoring operation on a plurality of target BWPs among the plurality of BWPs of the system bandwidth in accordance with the configuration information,
   wherein the performing the radio link monitoring operation on the plurality of target BWPs comprises: performing the radio link monitoring operation on the plurality of target BWPs through one counting unit for the radio link monitoring operation, wherein the one counting unit comprises a radio link in-sync counter, a radio link out-of-sync counter, and a radio link failure timer,
   wherein the performing the radio link monitoring operation on the plurality of BWPs through the one counting unit for the radio link monitoring operation comprises: performing, through the one counting unit, the radio link monitoring operation on all target BWPs of the plurality of target BWPs,
   wherein the performing, through the one counting unit, the radio link monitoring operation on all target BWPs of the plurality of target BWPs comprises: during the radio link monitoring operation, when a radio link corresponding to any one target BWP of the plurality of target BWPs monitored by the one counting unit is in the out-of-sync state, causing the radio link out-of-sync counter of the one counting unit to count in a cumulative manner; and/or when a radio link corresponding to any one target BWP of the plurality of target BWPs monitored by the one counting unit is in the in-sync state, causing the radio link in-sync counter of the one counting unit to count in a cumulative manner,
   wherein the radio link monitoring method further comprises:
   receiving indication information from a network device, the indication information comprising one of indication information for replacing or reconfiguring one or more BWPs for the radio link monitoring operation, and indication information for replacing or reconfiguring one or more BWPs for the radio link monitoring operation and one or more replaced or reconfigured BWPs for the radio link monitoring operation; and
   performing at least one of the following processes in accordance with the indication information: resetting at least one of the radio link in-sync counter, the radio link out-of-sync counter and the radio link failure timer of the counting unit corresponding to to-be-replaced or to-be-reconfigured BWP, or not resetting any one of the radio link in-sync counter, the radio link out-of-sync counter and the radio link failure timer of the counting unit corresponding to to-be-replaced or to-be-reconfigured BWP; or stopping the radio link monitoring operation on to-be-replaced or to-be-reconfigured BWP; or performing the radio link monitoring operation on the one or more replaced or reconfigured BWPs.

2. The radio link monitoring method according to claim 1, wherein the determining the configuration information for performing the radio link monitoring operation on the plurality of BWPs of the system bandwidth comprises:
determining the configuration information for performing the radio link monitoring operation on the plurality of BWPs in accordance with a predefined protocol; and/or
determining the configuration information for performing the radio link monitoring operation on the plurality of BWPs in accordance with a configuration configured by a network device.

3. The radio link monitoring method according to claim 1, wherein the radio link out-of-sync counter of the one counting unit corresponding to a first predetermined target BWP is configured to count a quantity of out-of-sync times when the radio link corresponding to the first predetermined target BWP is continuously in the out-of-sync state; and/or
the radio link in-sync counter of the one counting unit corresponding to a second predetermined target BWP is configured to count a quantity of in-sync times when the radio link corresponding to the second predetermined target BWP is continuously in the in-sync state.

4. The radio link monitoring method according to claim 1, comprising:
when the value of the radio link out-of-sync counter reaches a first predetermined threshold, starting the radio link failure timer which belongs to the one counting unit as the radio link out-of-sync counter; and/or
during the operation of the radio link failure timer, when the value of the radio link in-sync counter which belongs to the one counting unit as the radio link failure timer reaches a second predetermined threshold, stopping or resetting the radio link failure timer.

5. The radio link monitoring method according to claim 1, comprising:
when the value of the radio link failure timer of the one counting unit reaches a predetermined time threshold, performing a radio link processing procedure,
wherein the radio link processing procedure comprises at least one of:
triggering the radio link failure operation;
performing a deactivation procedure, a replacement procedure or a reconfiguration procedure on the plurality of BWPs monitored by the radio link monitoring operation;
triggering a failure event for the plurality of BWPs monitored by the radio link monitoring operation;
performing the deactivation procedure, the replacement procedure or the reconfiguration procedure on the plurality of BWPs corresponding to the one counting unit comprising the radio link failure timer whose value reaches the predetermined threshold; or
triggering the failure event for the plurality of BWPs corresponding to the one counting unit comprising the radio link failure timer whose value reaches the predetermined time threshold.

6. The radio link monitoring method according to claim 1, wherein when received quality of a reference signal for each of the target BWP does not meet a predetermined condition and/or when an indication indicating that any one target BWP of the plurality of target BWPs or a current UE is in the out-of-sync state has been received from a low layer, determining that the radio link corresponding to the target BWP is in the out-of-sync state; and/or
when the received quality of the reference signal for the target BWP meets the predetermined condition and/or when an indication indicating that any one target BWP of the plurality of target BWPs or the current UE is in the in-sync state has been received from the low layer, determining that the radio link corresponding to the target BWP is in the in-sync state.

7. The radio link monitoring method according to claim 1, wherein the reconfiguring one or more BWPs for the radio link monitoring operation comprises: reconfiguring one or more radio link monitor parameters for the one or more BWPs subject to the radio link monitoring operation,
wherein the one or more radio link monitor parameters comprise one or more reference signals used for the radio link monitoring operation.

8. The radio link monitoring method according to claim 1, wherein the reconfigured BWPs refer to those BWPs for which one or more radio link monitoring parameters are reconfigured, wherein the one or more radio link monitoring parameters comprise one or more reference signals used for the radio link monitoring operation.

9. The radio link monitoring method according to claim 8, wherein the one or more reference signals used for the radio link monitoring operation comprises a Channel State Information-Reference Signal (CSI-RS) and/or a Synchronization Signal Block (SSB); and/or
wherein the one or more radio link monitoring parameters comprises a first predetermined threshold of the radio link out-of-sync counter and/or a second predetermined threshold of the radio link in-sync counter, and a predetermined time threshold for the one counting unit.

10. A radio link monitoring method performed by a User Equipment (UE), comprising:
determining configuration information for performing a radio link monitoring operation on a plurality of Bandwidth Parts (BWPs) of a system bandwidth; and
performing the radio link monitoring operation on a plurality of target BWPs among the plurality of BWPs of the system bandwidth in accordance with the configuration information,
wherein the performing the radio link monitoring operation on the plurality of target BWPs comprises: performing the radio link monitoring operation on the plurality of target BWPs through at least two counting units for the radio link monitoring operation, wherein each of the at least two counting units comprises a radio link in-sync counter, a radio link out-of-sync counter, and a radio link failure timer,
wherein there exist at least three target BWPs which are divided into one first portion and one second portion, the one first portion comprises at least one target BWP and the at least one target BWP corresponds to a first counting unit of the two counting units, and the second portion comprises at least two target BWPs and the at least two target BWPs correspond to a second counting unit of the two counting units,
wherein the performing the radio link monitoring operation on the plurality of target BWPs through the at least two counting units for the radio link monitoring operation comprises:

performing the radio link monitoring operation on the at least one target BWPs of the first portion through the first counting unit and the radio link monitoring operation on the at least two target BWPs of the second portion through the second counting unit, respectively, wherein the radio link monitoring method further comprises:

receiving indication information from a network device, the indication information comprising one of: indication information for replacing or reconfiguring one or more BWPs for the radio link monitoring operation, or indication information for replacing or reconfiguring one or more BWPs for the radio link monitoring operation and one or more replaced or reconfigured BWPs for the radio link monitoring operation; and performing at least one of the following processes in accordance with the indication information: resetting at least one of the radio link in-sync counter, the radio link out-of-sync counter and the radio link failure timer of the counting unit corresponding to to-be-replaced or to-be-reconfigured BWP, or not resetting any one of the radio link in-sync counter, the radio link out-of-sync counter and the radio link failure timer of the counting unit corresponding to to-be-replaced or to-be-reconfigured BWP; or stopping the radio link monitoring operation on to-be-replaced or to-be-reconfigured BWP; or performing the radio link monitoring operation on the one or more replaced or reconfigured BWPs.

11. The radio link monitoring method according to claim 10, wherein the at least one target BWP comprised in the one first portion corresponds to counting units other than the second counting unit of the at least two counting units in a one-to-one manner, and/or the at least two target BWPs all correspond to the second counting unit of the at least two counting units, wherein the performing the radio link monitoring operation on the plurality of target BWPs through at least two counting units for the radio link monitoring operation comprises:

during the radio link monitoring operation on each target BWP of the first portion, when a radio link corresponding to a predetermined target BWP is in the out-of-sync state, causing the radio link out-of-sync counter of the first counting unit corresponding to the predetermined target BWP to count in a cumulative manner, and/or when the radio link corresponding to the predetermined target BWP is in the in-sync state, causing the radio link in-sync counter of the first counting unit corresponding to the predetermined target BWP to count in a cumulative manner; and/or during the radio link monitoring operation on each target BWP of the second portion, when a radio link corresponding to any one target BWP monitored by the second counting unit is in the out-of-sync state, causing the radio link out-of-sync counter of the second counting unit corresponding to the target BWP to count in a cumulative manner, and/or when the radio link corresponding to any one target BWP monitored by the second counting unit is in the in-sync state, causing the radio link in-sync counter of the second counting unit corresponding to the target BWP to count in a cumulative manner.

12. The radio link monitoring method according to claim 10, wherein during the radio link monitoring operation on each target BWP of the first portion, the radio link out-of-sync counter of the first counting unit corresponding to the predetermined target BWP is configured to count the quantity of out-of-sync times when the radio link corresponding to the predetermined target BWP is continuously in the out-of-sync state, and/or the radio link in-sync counter of the first counting unit corresponding to the predetermined target BWP is configured to count the quantity of in-sync times when the radio link corresponding to the predetermined target BWP is continuously in the in-sync state; and/or during the radio link monitoring operation on each target BWP of the second portion, the radio link out-of-sync counter of the second counting unit corresponding to each target BWP is configured to count the quantity of out-of-sync times when the radio link corresponding to the all target BWPs is continuously in the out-of-sync state, and/or the radio link in-sync counter of the second counting unit corresponding to each target BWP is configured to count the quantity of in-sync times when the radio link corresponding to the all target BWPs is continuously in the in-sync state.

13. The radio link monitoring method according to claim 10, comprising:

during the radio link monitoring operation on each target BWP of the first portion, when the value of the radio link failure timer of the first counting unit reaches a predetermined threshold, performing a radio link processing procedure, wherein the radio link processing procedure comprises at least one of:

triggering the radio link failure operation;

triggering a failure event for the plurality of BWPs monitored by the radio link monitoring operation;

triggering the failure event for the BWP corresponding to the counting unit comprising the radio link failure timer whose value reaches the predetermined threshold;

performing a deactivation procedure, a replacement procedure or a reconfiguration procedure on the BWP corresponding to the counting unit comprising the radio link failure timer whose value reaches the predetermined threshold; or performing the deactivation procedure, the replacement procedure or the reconfiguration procedure on the BWP for the radio link monitoring operation.

14. The radio link monitoring method according to claim 10, comprising:

during the radio link monitoring operation on each target BWP of the first portion, when the value of the radio link failure timer corresponding to the first counting unit reaches a predetermined threshold, performing a radio link processing procedure, wherein the radio link processing procedure comprises at least one of: triggering the radio link failure operation; performing a deactivation procedure, a replacement procedure or a reconfiguration procedure on one or more BWPs monitored by the radio link monitoring operation; or triggering the failure event for one or more BWPs monitored by the radio link monitoring operation, or during the radio link monitoring operation on each target BWP of the second portion, when the value of the radio link failure timer corresponding to the second counting unit reaches the predetermined threshold, performing a radio link processing procedure, wherein the radio link processing procedure comprises at least one of: triggering the radio link failure operation; triggering the failure event for one or more BWPs monitored by the radio link monitoring operation; triggering the failure event for the BWP corresponding to the second counting unit comprising the radio link failure timer whose value reaches the predetermined threshold; performing the deactivation procedure, the replacement procedure or the reconfiguration procedure on the BWP corresponding to the second counting unit comprising the radio link failure timer whose value reaches the predetermined threshold; or performing the deactivation procedure, the replacement procedure or the reconfiguration procedure on the one or more BWPs monitored by the radio link monitoring operation.

15. The radio link monitoring method according to claim 10, wherein the determining that the radio link corresponding to each target BWP is in the out-of-sync state comprises, when received quality of a reference signal for the target BWP does not meet a predetermined condition and/or when an indication indicating that any one target BWP of the plurality of target BWPs or a current UE is in the out-of-sync state has been received from a low layer, determining that the radio link corresponding to each target BWP is in the out-of-sync state; and/or the determining that the radio link corresponding to each target BWP is in the in-sync state comprises, when the received quality of the reference signal for the target BWP meets the predetermined condition and/or when an indication indicating that any one target BWP of the plurality of target BWPs or the current UE is in the in-sync state has been received from the low layer, determining that the radio link corresponding to each target BWP is in the in-sync state.

16. The radio link monitoring method according to claim 10, wherein the reconfiguring one or more BWPs for the radio link monitoring operation comprises: reconfiguring one or more radio link monitor parameters for the one or more BWPs subject to the radio link monitoring operation, wherein the one or more radio link monitor parameters comprise one or more reference signals used for the radio link monitoring operation.

17. The radio link monitoring method according to claim 10, wherein the reconfigured BWPs refer to those BWPs for which one or more radio link monitoring parameters are reconfigured, wherein the one or more radio link monitoring parameters comprise one or more reference signals used for the radio link monitoring operation.

18. The radio link monitoring method according to claim 17, wherein the reference signal used for the radio link monitoring operation comprises a Channel State Information-Reference Signal (CSI-RS) and/or a Synchronization Signal Block (SSB); and/or wherein the one or more radio link monitoring parameters comprises a first predetermined threshold of the radio link out-of-sync counter and/or a second predetermined threshold of the radio link in-sync counter, and a predetermined time threshold for the one counting unit.

* * * * *